United States Patent
Dupont et al.

(10) Patent No.: US 12,382,068 B2
(45) Date of Patent: Aug. 5, 2025

(54) HIGH-PERFORMANCE AND LOW-COMPLEXITY NEURAL COMPRESSION FROM A SINGLE IMAGE, VIDEO OR AUDIO DATA

(71) Applicant: DeepMind Technologies Limited, London (GB)

(72) Inventors: Emilien Dupont, London (GB); Hyun Jik Kim, London (GB); Matthias Stephan Bauer, London (GB); Lucas Marvin Theis, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 18/949,892

(22) Filed: Nov. 15, 2024

(65) Prior Publication Data
US 2025/0168368 A1 May 22, 2025

Related U.S. Application Data

(60) Provisional application No. 63/600,412, filed on Nov. 17, 2023.

(51) Int. Cl.
| | | |
|---|---|---|
| *G06K 9/62* | (2022.01) | |
| *H04N 19/119* | (2014.01) | |
| *H04N 19/124* | (2014.01) | |
| *H04N 19/167* | (2014.01) | |
| *H04N 19/189* | (2014.01) | |
| *H04N 19/30* | (2014.01) | |

(52) U.S. Cl.
CPC ......... *H04N 19/189* (2014.11); *H04N 19/119* (2014.11); *H04N 19/124* (2014.11); *H04N 19/167* (2014.11); *H04N 19/30* (2014.11)

(58) Field of Classification Search
None
See application file for complete search history.

(56) References Cited

U.S. PATENT DOCUMENTS

| | | | | |
|---|---|---|---|---|
| 6,405,341 B1* | 6/2002 | Maru | .................... | H03M 13/01 |
| | | | | 375/348 |
| 6,411,236 B1* | 6/2002 | Kermani | ................. | H04L 47/10 |
| | | | | 710/244 |
| 6,493,389 B1* | 12/2002 | Bailleul | ................. | H04N 19/51 |
| | | | | 375/240 |

(Continued)

FOREIGN PATENT DOCUMENTS

| | | | |
|---|---|---|---|
| CN | 106059640 A | * 10/2016 | |
| CN | 112866668 A | * 5/2021 | ........... H04N 13/106 |

(Continued)

OTHER PUBLICATIONS

Schwarz et al., "Modality-agnostic variational compression of implicit neural representations." arXiv preprint arXiv:2301.09479 (2023). (Year: 2023).*

(Continued)

*Primary Examiner* — Feng Niu
(74) *Attorney, Agent, or Firm* — Fish & Richardson P.C.

(57) ABSTRACT

Methods, systems, and apparatus, including computer programs encoded on a computer storage medium for encoding input data comprising input data values corresponding to respective input data grid points of an input data grid, such as image, video or audio data.

30 Claims, 8 Drawing Sheets

(56) References Cited

U.S. PATENT DOCUMENTS

| | | | | |
|---|---|---|---|---|
| 7,742,643 | B2* | 6/2010 | Yang | H04N 19/19 382/250 |
| 7,793,189 | B2* | 9/2010 | Yano | H03M 13/611 714/751 |
| 8,190,550 | B2* | 5/2012 | Bouchard | G06F 17/10 706/20 |
| 8,244,524 | B2* | 8/2012 | Shirakawa | G10L 19/02 704/205 |
| 10,133,933 | B1* | 11/2018 | Fisher | G06V 20/41 |
| 10,395,098 | B2* | 8/2019 | Hwang | G06F 18/2132 |
| 10,474,988 | B2* | 11/2019 | Fisher | G06V 10/82 |
| 10,839,259 | B2* | 11/2020 | Shazeer | G06V 10/82 |
| 10,970,441 | B1* | 4/2021 | Zhang | G06N 3/063 |
| 11,151,447 | B1* | 10/2021 | Chen | G01S 7/4091 |
| 11,214,268 | B2* | 1/2022 | Gonzalez Aguirre | G05B 23/024 |
| 11,347,995 | B2* | 5/2022 | Bender | G06N 3/04 |
| 11,531,852 | B2* | 12/2022 | Vahdat | G06N 7/01 |
| 11,677,948 | B2* | 6/2023 | Besenbruch | H04N 19/13 375/240.03 |
| 11,854,182 | B2* | 12/2023 | Wang | G06V 10/82 |
| 2005/0166129 | A1* | 7/2005 | Yano | H03M 13/2957 714/797 |
| 2006/0013493 | A1* | 1/2006 | Yang | H03M 7/4006 382/232 |
| 2007/0094023 | A1* | 4/2007 | Gallino | G10L 15/04 704/E15.005 |
| 2010/0074330 | A1* | 3/2010 | Fu | H04N 19/436 375/240.12 |
| 2010/0106511 | A1* | 4/2010 | Shirakawa | G10L 19/02 704/500 |
| 2010/0318490 | A1* | 12/2010 | Bouchard | G06F 17/10 706/52 |
| 2012/0177234 | A1* | 7/2012 | Rank | H04R 25/554 381/314 |
| 2017/0055003 | A1* | 2/2017 | Yu | H04N 19/70 |
| 2017/0236000 | A1* | 8/2017 | Hwang | G06F 18/2411 382/103 |
| 2019/0043003 | A1* | 2/2019 | Fisher | G06V 10/82 |
| 2019/0130213 | A1* | 5/2019 | Shazeer | G06N 3/084 |
| 2019/0135300 | A1* | 5/2019 | Gonzalez Aguirre | G06N 20/00 |
| 2020/0184375 | A1* | 6/2020 | Ohwa | G06N 5/01 |
| 2020/0379893 | A1* | 12/2020 | Arechiga Gonzalez | G06F 30/15 |
| 2021/0097401 | A1* | 4/2021 | Ramalho | G06N 3/045 |
| 2021/0133590 | A1* | 5/2021 | Amroabadi | G06N 3/04 |
| 2021/0158211 | A1* | 5/2021 | Talwar | G06F 21/6245 |
| 2021/0232958 | A1* | 7/2021 | Yamaguchi | G06N 5/01 |
| 2021/0303967 | A1* | 9/2021 | Bender | G06N 3/08 |
| 2021/0374608 | A1* | 12/2021 | El-Khamy | G06N 20/20 |
| 2021/0383222 | A1* | 12/2021 | Saxton | G06N 3/08 |
| 2022/0156479 | A1* | 5/2022 | Wang | G01J 3/51 |
| 2022/0188636 | A1* | 6/2022 | Pham | G06N 3/08 |
| 2022/0293247 | A1* | 9/2022 | Gibson | G16H 50/30 |
| 2022/0382880 | A1* | 12/2022 | Castiglione | G06N 3/08 |
| 2022/0383036 | A1* | 12/2022 | Nazi | G06F 18/22 |
| 2022/0415453 | A1* | 12/2022 | Ronneberger | G16B 40/20 |
| 2023/0061004 | A1* | 3/2023 | Wang | B25J 11/00 |
| 2023/0073174 | A1* | 3/2023 | Clark | G10L 25/06 |
| 2023/0154055 | A1* | 5/2023 | Besenbruch | H04N 19/91 375/240.03 |
| 2023/0267216 | A1* | 8/2023 | Santana De Oliveira | G06F 21/6245 726/26 |
| 2023/0299788 | A1* | 9/2023 | Agustsson | G06N 3/045 341/94 |
| 2023/0329646 | A1* | 10/2023 | Zhou | A61B 7/003 |
| 2023/0351042 | A1* | 11/2023 | De | G06F 21/6245 |
| 2023/0368337 | A1* | 11/2023 | Karras | G06N 3/044 |
| 2023/0401424 | A1* | 12/2023 | Jiang | G06N 3/043 |
| 2024/0086760 | A1* | 3/2024 | Fraboni | G06N 20/00 |
| 2024/0354553 | A1* | 10/2024 | Finlay | G06N 3/0495 |
| 2024/0386275 | A1* | 11/2024 | Yang | G06N 3/082 |

FOREIGN PATENT DOCUMENTS

| | | | | |
|---|---|---|---|---|
| CN | 113313238 A | * | 8/2021 | G06F 18/241 |
| CN | 113807265 A | * | 12/2021 | |
| CN | 114037051 A | * | 2/2022 | |
| CN | 114088658 A | * | 2/2022 | G01N 21/359 |
| WO | WO-2022140583 A1 | * | 6/2022 | A61B 5/7267 |
| WO | WO-2022248891 A1 | * | 12/2022 | G06N 3/0454 |

OTHER PUBLICATIONS

Gong et al., "Differentiable soft quantization: Bridging full-precision and low-bit neural networks." In Proceedings of the IEEE/CVF international conference on computer vision, pp. 4852-4861. 2019. (Year: 2019).*
Wikipedia, Simulated annealing, published on Aug. 26, 2023 (Year: 2023).*
Wikipedia, autoencoder, published on Nov. 12, 2023 (Year: 2023).*
Ballé et al., "End-to-end optimization of nonlinear transform codes for perceptual quality," 2016 Picture Coding Symposium (PCS), Nuremberg, Germany, 2016, pp. 1-5 (Year: 2016).*
Li, Zhiyuan, and Sanjeev Arora. "An exponential learning rate schedule for deep learning." arXiv preprint arXiv:1910.07454 (2019). (Year: 2019).*
Machine translation of WO 2022140583 A1 (Year: 2022).*
Machine translation of WO 2022248891 A1 (Year: 2022).*
Herglotz et al., "Beyond Bjøntegaard: Limits of Video Compression Performance Comparisons," 2022 IEEE International Conference on Image Processing (ICIP), Bordeaux, France, 2022, pp. 46-50 (Year: 2022).*
Lewkowycz, "How to decay your learning rate." arXiv preprint arXiv:2103.12682 (2021). (Year: 2021).*
Normal distribution—Wikipedia (Year: 2023).*
Laplace distribution—Wikipedia (Year: 2023).*
International Search Report and Written Opinion in International Appln. No. PCT/EP2024/082596, dated Feb. 13, 2025, 17 pages.
Agustsson et al., "Scale-space flow for end-to-end optimized video compression," Presented at the 2020 IEEE/CVF Conf. on Computer Vision and Pattern Recognition (CVPR), Jun. 13-19, 2020, pp. 8503-8512.
Agustsson et al., "Universally Quantized Neural Compression," Presented at the 34th Conference on Neural Information Processing Systems (NeurIPS 2020), Dec. 6-12, 2020, 10 pages.
Bai et al., "PS-NeRV: Patch-Wise Stylized Neural Representations for Videos," 2023 IEEE International Conference on Image Processing (ICIP), Oct. 8-11, 2023, pp. 41-45.
Ballé et al., "End-to-end Optimized Image Compression," CoRR, Submitted on Mar. 3, 2017, arXiv:1611.01704v3, 27 pages.
Ballé et al., "Variational image compression with a scale hyperprior," Presented at the 6th International Conference on Learning Representations, Apr. 30-May 3, 2018, 47 pages.
Begaint et al., "CompressAI: a PyTorch library and evaluation platform for end-to-end compression research," CoRR, Nov. 5, 2020, arxiv.org/abs/2011.03029, 19 pages.
bellard.org [online], "BPG Image Format," available on or before Nov. 11, 2023, via Internet Archive: Wayback Machine URL<https://web.archive.org/web/20231111133027/https://bellard.org/bpg/>, retrieved on Nov. 25, 2024, retrieved from URL<https://bellard.org/bpg/>, 2 pages.
Bjontegaard et al., "Calculation of average PSNR differences between RD-curves," Paper, Presented at the 13th Meeting of the Video Coding Experts Group (VCEG), Austin Texas, USA, Apr. 2-4, 2001; ITU SG16 Doc, VCEG-M33, Mar. 26, 2001, 4 pages.
Bross et al., "Overview of the Versatile Video Coding (VVC) Standard and Its Applications," IEEE Transactions on Circuits and Systems for Video Technology, Oct. 2021, 31(10):3736-3764.
Campos et al., "Content Adaptive Optimization for Neural Image Compression," Presented at the 2019 IEEE/CVF Conference on Computer Vision and Pattern Recognition Workshops (CVPRW), Jun. 15-20, 2019, 5 pages.
Catania et al., "Nif: A Fast Implicit Image Compression with Bottleneck Layers and Modulated Sinusoidal Activations," Pre-

(56) References Cited

OTHER PUBLICATIONS sented at the 31st ACM International Conference on Multimedia (MM'23), Oct. 29-Nov. 3, 2023, pp. 9022-9031.
Chen et al., "HNeRV: A Hybrid Neural Representation for Videos," Presented at the 2023 IEEE/CVF Conference on Computer Vision and Pattern Recognition (CVPR), Jun. 17-24, 2023, pp. 10270-10279.
Chen et al., "NeRV: Neural Representations for Videos," Presented at the 34th Conference on Neural Information Processing Systems (NeurIPS 2020), Dec. 6-12, 2020, 12 pages.
Cheng et al., "Learned Image Compression With Discretized Gaussian Mixture Likelihoods and Attention Modules," Presented at the 2020 IEEE/CVF Conference on Computer Vision and Pattern Recognition (CVPR), Jun. 13-19, 2020, pp. 7939-7948.
Clare et al., "Wavefront Parallel Processing for HEVC Encoding and Decoding," Presented at the 6th Meeting of the Joint Collaborative Team on Video Coding (JCT-VC), Jul. 14-22, 2011, 16 pages.
Damodaran et al., "Rqat-inr: Improved implicit neural image compression," 2023 Data Compression Conference (DCC), Mar. 21-24, 2023, pp. 208-217.
Davies et al., "On the Effectiveness of Weight-Encoded Neural Implicit 3D Shapes," CoRR, Submitted on Jan. 17, 2021, arXiv:2009.09808v3, 13 pages.
Dupont et al., "COIN: COmpression with Implicit Neural representations," CoRR, Mar. 3, 2021, arXiv:2103.03123v2, 12 pages.
Dupont et al., "COIN++: Neural Compression Across Modalities," Transactions on Machine Learning Research, Nov. 2022, 26 pages.
Gao et al., "SINCO: A Novel Structural Regularizer for Image Compression Using Implicit Neural Representations," Presented at the ICASSP 2023—2023 IEEE International Conference on Acoustics, Speech and Signal Processing (ICASSP), Jun. 4-10, 2023, 5 pages.
Girish et al., "Scalable HAsh-grid Compression for Implicit Neural Representations," Presented at the 2023 IEEE/CVF International Conference on Computer Vision (ICCV), Oct. 1-6, 2023, pp. 17513-17524.
Gomes et al., "Video Compression with Entropy-Constrained Neural Representations," Presented at the 2023 IEEE/CVF International Conference on Computer Vision (ICCV), Oct. 1-6, 2023, pp. 18497-18506.
Gordon et al., "On Quantizing Implicit Neural Representations," Presented at the 2023 IEEE/CVF Winter Conference on Applications of Computer Vision (WACV), Jan. 2-7, 2023, pp. 341-350.
Guo et al., "Compression with Bayesian Implicit Neural Representations," CoRR, Submitted on Oct. 29, 2023, arXiv:2305.19185v5, 19 pages.
Guo et al., "Variable Rate Image Compression With Content Adaptive Optimization," Presented at the 2020 IEEE/CVF Conference on Computer Vision and Pattern Recognition (CVPR 2020), Seattle, Jun. 14-19, 2020, pp. 122-123.
Guo-Hua et al., "EVC: Towards Real-Time Neural Image Compression with Mask Decay," Presented at the Eleventh International Conference on Learning Representations, May 1-5, 2023, 23 pages.
Han et al., "Deep Generative Video Compression," CoRR, Oct. 5, 2018, arxiv.org/abs/1810.02845, 15 pages.
He et al., "Checkerboard Context Model for Efficient Learned Image Compression," Presented at the 2021 IEEE/CVF Conference on Computer Vision and Pattern Recognition (CVPR), Jun. 20-25, 2021, pp. 14771-14780.
He et al., "ELIC: Efficient Learned Image Compression With Unevenly Grouped Space-Channel Contextual Adaptive Coding," Presented at the 2022 IEEE/CVF Conference on Computer Vision and Pattern Recognition (CVPR), Jun. 18-24, 2022, pp. 5718-5727.
He et al., "REcombiner: Robust and Enhanced Compression with Bayesian Implicit Neural Representations," CoRR, Submitted on Sep. 29, 2023, arXiv:2309.17182v1, 24 pages.
Hendrycks et al. "Gaussian Error Linear Units (GELUs)," CoRR, Submitted on Jun. 6, 2023, arXiv:1606.08415v5, 10 pages.
Henry et al., "Wavefront Parallel Processing," Presented at the 5th Meeting of the Collaborative Team on Video Coding (JCT-VC), Mar. 16-23, 2011, 9 pages.
Huang et al., "Compressing multidimensional weather and climate data into neural networks," Presented at the Eleventh International Conference on Learning Representations, May 1-5, 2023, 17 pages.
[No Author Listed] "Information Technology—Digital Compression and Coding of Continuous-Tone Still Images—Requirements and Guidelines," International Telecommunication Union (ITU-T), Recommendation T.81, Sep. 1992, 186 pages.
Isik et al., "LVAC: Learned volumetric attribute compression for point clouds using coordinate based networks," Frontiers in Signal Processing, Oct. 11, 2022, 2:1008812, 18 pages.
Jiang et al., "MLIC: Multi-Reference Entropy Model for Learned Image Compression," Presented at the 31st ACM International Conference on Multimedia, Oct. 29-Nov. 3, 2023, pp. 7618-7627.
Johnston et al., "Computationally Efficient Neural Image Compression," CoRR, Dec. 18, 2019, arXiv:1912.08771v1, 9 pages.
Kumaraswamy, "A generalized probability density function for double-bounded random processes," Journal of Hydrology, Mar. 1980, 46(1-2):79-88.
Kwan et al., "HiNeRV: Video Compression with Hierarchical Encoding-based Neural Representation," Presented at the 37th Conference on Neural Information Processing Systems (NeurIPS 2023), Dec. 10-16, 2023, 13 pages.
Ladune et al., "Cool-Chic: Coordinate-based Low Complexity Hierarchical Image Codec," Presented at the 2023 IEEE/CVF International Conference on Computer Vision (ICCV), Oct. 1-6, 2023, pp. 13515-13522.
Lanzendo et al., "Siamese SIREN: Audio Compression with Implicit Neural Representations," CoRR, Submitted on Jun. 22, 2023, arXiv:2306.12957v1, 7 pages.
Le et al., "MobileCodec: Neural Inter-frame Video Compression on Mobile Devices," Presented at the 13th ACM Multimedia Systems Conference (MMSys '22), Jun. 14- 17, 2022, pp. 324-330.
Lee et al., "FFNeRV: Flow-Guided Frame-Wise Neural Representations for Videos," CoRR, Submitted on Aug. 7, 2023, arXiv:2212.12294v2, 15 pages.
Lee et al., "Meta-learning Sparse Implicit Neural Representations," Presented at the 35th Conference on Neural Information Processing Systems (NeurIPS 2021), Dec. 6-14, 2021, 12 pages.
Leguay et al., "Low-complexity Overfitted Neural Image Codec," CoRR, Jul. 24, 2023, arXiv:2307.12706v1, 6 pages.
Li et al., "Compressing Volumetric Radiance Fields to 1 MB," 2023 IEEE/CVF Conference on Computer Vision and Pattern Recognition (CVPR), Jun. 17-24, 2023, pp. 4222-4231.
Li et al., "E-NeRV: Expedite neural video representation with disentangled spatial-temporal context," European Conference on Computer Vision, Nov. 4, 2022, pp. 267-284.
Lu et al., "Compressive neural representations of volumetric scalar fields," Computer Graphics Forum, Jun. 29, 2021, 40(3)135-146.
Lu et al., "Content adaptive and error propagation aware deep video compression," European Conference on Computer Vision, Aug. 23-28, 2020, pp. 456-472.
Lv et al., "Dynamic low-rank instance adaptation for universal neural image compression," Proceedings of the 31st ACM International Conference on Multimedia, Oct. 27, 2023, pp. 632-642.
Mancini et al., "Lossy compression of multidimensional medical images using sinusoidal activation networks: An evaluation study," International Workshop on Computational Diffusion MRI, Dec. 1, 2022, pp. 26-37.
Martin, "Range encoding: An algorithm for removing redundancy from a digitized message," Video & Data Recording Conference, Jul. 24-27, 1979, 9 pages.
Mentzer et al., "VCT: A video compression transformer," Advances in Neural Information Processing Systems 35, 2022, 13 pages.
Mercat et al., "UVG dataset: 50/120fps 4K sequences for video codec analysis and development," Proceedings of the 11th ACM Multimedia Systems Conference, May 27, 2020, pp. 297-302.
Mikami et al., "An efficient image compression method based on neural network: An overfitting approach," 2021 IEEE International Conference on Image Processing (ICIP), Sep. 19-22, 2021, pp. 2084-2088.

(56) References Cited

OTHER PUBLICATIONS

Minnen et al., "Advancing the rate-distortion-computation frontier for neural image compression," 2023 IEEE International Conference on Image Processing (ICIP), Oct. 8-11, 2023, pp. 2940-2944.

Minnen et al., "Joint autoregressive and hierarchical priors for learned image compression," Advances in neural information processing systems 31, 2018, 10 pages.

netflixtechblog.com [online], "Per-Title Encode Optimization," Dec. 14, 2015, retrieved on Nov. 25, 2024, retrieved from URL<https://netflixtechblog.com/per-title-encode-optimization-7e99442b62a2>, 23 pages.

Perez et al., "FiLM: Visual Reasoning with a General Conditioning Layer," CoRR, Submitted on Dec. 18, 2017, arXiv:1709.07871v2, 13 pages.

Pham et al., "Autoencoding implicit neural representations for image compression," ICML 2023 Workshop Neural Compression: From Information Theory to Applications, 2023, 13 pages.

r0K.us [online], "Kodak Lossless True Color Image Suite," available on or before Oct. 18, 2023, via Internet Archive: Wayback Machine URL<https://web.archive.org/web/20231018203019/https://r0k.US/graphics/kodak/>, retrieved on Nov. 26, 2024, retrieved from URL<https://r0k.us/graphics/kodak/>, 4 pages.

Ramirez et al., "L0onie: Compressing COINs with L0-constraints," CoRR, Jul. 8, 2022, arxiv.org/abs/2207.04144, 14 pages.

Rippel et al., "ELF-VC: Efficient learned flexible-rate video coding," Proceedings of the IEEE/CVF International Conference on Computer Vision (ICCV), 2021, pp. 14479-14488.

Rozendaal et al., "Instance-Adaptive video compression: Improving neural codecs by training on the test set," CoRR, Nov. 19, 2021, arxiv.org/abs/2111.10302.

Rozendaal et al., "Mobilenvc: Real-time 1080p neural video compression on a mobile device," CoRR, Oct. 2, 2023, arxiv.org/abs/2310.01258, 15 pages.

Rozendaal et al., "Over-fitting for fun and profit: Instance-adaptive data compression," International Conference on Learning Representations, Jan. 12, 2021, 18 pages.

Santurkar et al., "Generative Compression," CoRR, Mar. 4, 2017, arxiv.org/abs/1703.01467, 10 pages.

Schwarz et al., "Meta-learning sparse compression networks," Transactions on Machine Learning Research, Aug. 2022, 15 pages.

Schwarz et al., "Modality-agnostic variational compression of implicit neural representations," Proceedings of the 40th International Conference on Machine Learning, Jul. 23, 2023, 1258:30342-30364.

Sheibanifard et al., "A novel implicit neural representation for vol. data," Applied Sciences, Mar. 3, 2023, 13(5):3242.

Shi et al., "AlphaVC: High-performance and efficient learned video compression," European Conference on Computer Vision, Nov. 9, 2022, pp. 616-631.

Strumpler et al., "Implicit neural representations for image compression," European Conference on Computer Vision, Nov. 1, 2022, pp. 74-91.

Sullivan et al., "Overview of the high efficiency video coding (HEVC) standard," IEEE Transactions on Circuits and Systems for Video Technology, Dec. 2012, 22(12):1649-1668.

Takikawa et al., "Variable bitrate neural fields," CoRR, Jun. 15, 2022, arxiv.org/abs/2206.07707, 10 pages.

Theis et al., "Lossy image compression with compressive autoencoders," CoRR, Mar. 1, 2017, arXiv:1703.00395, 19 pages.

Wu et al., "Video Compression through Image Interpolation," CoRR, Apr. 18, 2018, arxiv.org/abs/1804.06919, 18 pages.

Xiang et al., "MIMT: Masked image modeling transformer for video compression," The Eleventh International Conference on Learning Representations, Feb. 1, 2023, 17 pages.

Xie et al., "Neural fields in visual computing and beyond," Computer Graphics Forum, May 24, 2022, pp. 641-676.

Yang et al., "An introduction to neural data compression," Foundations and Trends® in Computer Graphics and Vision, Apr. 25, 2023, 15(2):113-200.

Yang et al., "Computationally-efficient neural image compression with shallow decoders," Proceedings of the IEEE/CVF International Conference on Computer Vision (ICCV), 2023, pp. 530-540.

Yang et al., "Improving inference for neural image compression," Advances in Neural Information Processing Systems, 2020, 33:573-584.

\* cited by examiner

HIGH-PERFORMANCE AND LOW-COMPLEXITY NEURAL COMPRESSION FROM A SINGLE IMAGE, VIDEO OR AUDIO DATA

CROSS-REFERENCE TO RELATED APPLICATIONS

This application claims priority to U.S. Provisional Application No. 63/600,412 filed on Nov. 17, 2023. The disclosure of the prior application is considered part of and are incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations for encoding (compressing) input data, such as audio data, image data, or video data.

According to one aspect there is provided a method of encoding input data performed by one or more data processing apparatus. The input data comprises input data values (x) corresponding to respective input data grid points of an input data grid. The method comprises: (a) optimizing an objective function by jointly optimizing parameters ($\theta$) of a synthesis neural network ($f_\theta$), parameters ($\psi$) of a decoder (or "entropy model" or "entropy net") neural network ($g_\psi$), and a set of latent values (z), the latent values corresponding to respective latent grid points of each of a plurality of latent grids having different respective resolutions (e.g. spatial and/or temporal resolutions). The optimizing comprises, for each of a plurality of optimization iterations, determining gradients (e.g., $\nabla_{\theta,\psi,z}\mathcal{L}_{\theta,\psi}(z)$) of the objective function ($\mathcal{L}_{\theta,\psi}(z)$) using the latent values and using the gradients to update one or more (e.g., each) of: the parameters of the synthesis neural network, the parameters of the decoder neural network, and the latent values.

The method further comprises: quantizing the optimized latent values; and encoding the quantized latent values using a probability distribution for the latent values, the probability distribution being defined by the decoder (e.g., entropy model) neural network. The encoding may, for example, be (lossless) entropy coding, or wavefront coding. The probability distribution may be an autoregressive probability distribution, e.g., in which the probability distribution is a product of conditional probability distributions for each latent value, each conditional probability distribution being conditioned on latent values for latent grid points in the latent grid that precede the latent grid point of the latent value (and, optionally, on latent values in other latent grids of different (e.g., lower) spatial resolution than the latent grid of the latent value). In some instances, the probability distribution is an autoregressive integrated Laplace distribution, for example.

The objective function can comprise a reconstruction loss term comparing the input data values with corresponding reconstructed data values determined by the synthesis neural network using the set of latent values (e.g., after decoding of the latent values with the decoder neural network), and a compressibility term dependent on a probability of the set of latent values determined from the probability distribution defined by the decoder neural network.

In some implementations, the reconstruction loss term may, for example, be calculated from a sum of the squares of the error (difference) between the input data values and the corresponding reconstructed data values determined using the synthesis network.

In some implementations, the compressibility term may be indicative of how effectively the latent values can be encoded or compressed, e.g., the number of bits required to encode the latent values. For example, the compressibility term may be proportional to the entropy (information content) of the set of latent values determined using the probability distribution. A weighting parameter (which may be referred to as a "rate distortion" parameter) may be applied to the reconstruction loss term or the compressibility term to control the relative contributions of the terms in the objective function, thereby allowing better reconstruction of the input data to be traded off against the amount of compression applied to the input data.

The neural networks may be convolutional neural networks in some examples.

In some implementations, the optimizing further comprises updating the latent values by applying a rounding function to each of the latent values (before and/or after determining the gradients of the objective function). In some implementations, the rounding function can be a soft-rounding function, e.g. a rounding function that is a smooth (differentiable) approximation to a hard-rounding function.

The hard-rounding function may, for example, map a first continuous value (e.g., a floating point number) to one of a smaller set of discrete values (e.g., integers). This mapping may be referred to as "quantizing" the value. For example, a continuous value represented by a floating point number may be mapped (quantized) to an integer value nearest to the floating point number, or to a nearest integer value that precedes the floating point number, or to a nearest integer value that follows the floating point number. By contrast, a soft-rounding function may approximate the hard-rounding function by mapping a first continuous value to a second continuous value that is nearer to the discrete value obtained by applying the hard-rounding function to the first continuous value than to the first continuous value.

In some implementations, updating the latent values comprises: updating each of the latent values by sampling a respective noise value from a noise distribution and adding the noise value to the latent value, wherein the soft-rounding function is applied to each of the latent values before and/or after adding the respective noise value. The noise distribution may be non-uniform (i.e., biased towards some noise values compared to others), e.g., the noise distribution may be a Kumaraswamy distribution, or another non-uniform probability distribution, such as a probability distribution that is or approximates a Beta distribution. The addition of noise, together with the use of the soft-rounding function, may assist in the creation of an information bottleneck during the optimizing. A non-uniform noise distribution may be particularly advantageous when the quantization error is correlated with the input data values.

The noise distribution may have a shape parameter that controls a shape of the noise distribution. For example, the shape parameter may be used to vary (interpolate) the noise distribution between a peaked (low-noise) distribution and a uniform distribution. The shape parameter may be adjusted between the optimization iterations to make the noise distribution become more uniform, i.e., the noise distribution may be initially peaked and then become more uniform over the course of the optimization iterations.

The soft-rounding function may depend on a temperature parameter that controls a smoothness of the soft-rounding function, i.e., the accuracy with which the soft-rounding function approximates the hard-rounding function. The smoothness of the soft-rounding function may be determined, for example, using one or more derivatives of the soft-rounding function. For example, the temperature parameter of the soft-rounding function may control an extent to which the soft-rounding function resembles the hard-rounding function rather than an identity function.

The temperature parameter may be adjusted ("annealed") between the optimization iterations, e.g., such that the soft-rounding function increasingly resembles the hard-rounding function (i.e., a measure of the error in approximating the hard-rounding function decreases between optimization iterations), e.g., the temperature parameter can have a (relatively) high initial value that is decreased to a lower value by the end of the optimization iteration sequence.

In some implementations, using the gradients comprises multiplying the gradients by a learning rate before updating the one or more of: the parameters of the synthesis neural network, the parameters of the decoder neural network, and the latent values. The learning rate may vary between the optimization iterations (i.e., from one iteration to the next) e.g. according to a decay schedule, which may be a cosine decay schedule. That is, the learning rate may be varied according to a cosine function of an index denoting the position of the optimization iteration in the sequence of optimization iterations. The optimizing may in general be performed using a (first-order) gradient-based optimizer, such as the Adam optimizer.

In some implementations, the method may further comprise (as e.g., a second stage of the optimizing), for each of a plurality of further optimization iterations (i.e. iterations subsequent to the last of the optimization iterations): quantizing the latent values using a further hard-rounding function; using a soft-rounding estimator to determine further gradients ($\nabla_{\theta,\psi} \mathcal{L}_{\theta,\psi}(z)$) of the objective function using the quantized latent values, wherein the soft-rounding estimator provides a smooth (differentiable) approximation to the gradient of the hard-rounding function; and using the gradients determined using the soft-rounding estimator to update one or more (e.g., each) of: the parameters of the synthesis neural network, and the parameters of the decoder neural network. In some implementations, the quantized latent values can remain fixed during the second stage of the optimization.

In some cases, the soft-rounding estimator depends on a temperature parameter that controls the smoothness of the gradient of the further hard-rounding function. The temperature parameter may be adjusted between the further optimization iterations such that the gradient of the soft-rounding function increasingly resembles the gradient of the further hard-rounding function. The further hard-rounding function may be a hard-rounding function that is used to quantize the latent values after the optimizing.

Using the further gradients may comprise multiplying the further gradients by a further learning rate before updating the one or more of: the parameters of the synthesis neural network, and the parameters of the decoder neural network. The further learning rate may be decreased between the further optimization iterations.

The further hard-rounding function may quantize the latent values in steps smaller than the steps used by a hard-rounding function for quantizing the latent values after the optimizing. In some cases, the further hard-rounding function may quantize the latent values in steps smaller than one (e.g., steps of 0.5, 0.2, or 0.1 etc.), which has been found to improve the optimization, e.g., by allowing the latent values to remain small during the optimization. The soft-rounding estimator (and/or the soft-rounding function) may have the same step size as the further hard-rounding function in some cases.

In some implementations, the probability of the set of latent values is determined by, for each of the latent grid points of each of the latent grids: determining a causal subset of (or "context" for) the latent values comprising latent values corresponding to latent grid points that precede the latent grid point in the latent grid; and using the decoder neural network to determine, from the latent values in the causal subset, one or more probability distribution parameters defining a conditional probability distribution for a latent value at the latent grid point, and using the conditional probability distribution defined by the one or more probability distribution parameters to determine the probability of the latent value conditioned on the latent values in the causal subset.

The causal subset may, for example, be determined by applying a causal mask to the latent values of the grid. In general, the causal subset may be a proper subset comprising some but not all of the latent values of the latent grid, while the causal subset for a first latent grid point in a latent grid may be empty, or contain latent values of a latent grid of lower spatial resolution than the grid. The latent values of each latent grid may be processed autoregressively, e.g., in a raster scan order.

In some implementations, the parameters of the probability distribution may include location (e.g., mean) and scale (e.g., variance) parameters for a conditional probability distribution for the latent value at the latent grid point. For implementations in which the probability distribution is an autoregressive integrated Laplace distribution, the parameters of the probability distribution at each latent grid point may comprise location and scale parameters of a Laplace distribution, for example.

In some implementations, for one or more of the latent grids, the causal subsets of the latent values for each of the latent grid points of the latent grid comprise latent values (e.g., some or all) of another (or more than one other) of the latent grids that has a resolution that is less than a resolution of the latent grid. For example, the other latent grid may immediately precede the latent grid when the latent grids are arranged in ascending order of resolution.

In some implementations, the decoder neural network may comprise a plurality of decoder subnetworks, each encoder subnetwork being configured to process the latent values of a respective one of the latent grids. Each decoder subnetwork may process the latent values of the respective one of the latent grids independently of the latent values of other latent grids. That is, the decoder neural network may comprise independent "resolution-dependent" decoder subnetworks that each processes the latent values for a latent grid at a particular resolution. The decoder subnetworks may therefore operate in parallel with one another, thereby allowing the method to take advantage of hardware accelerators for performing parallel processing, such as graphics processing units (GPUs) or tensor processing units (TPUs).

Additionally or alternatively, the decoder neural network may comprise an input layer, an output layer, and intermediate layers between the input and output layers, the intermediate layers comprising activation functions for determining features of the latent values at different resolutions (e.g., the different resolutions of the latent grids), wherein one or more of the intermediate layers comprises a modulation layer configured to apply a transformation (e.g., an affine transformation) to features of latent values at a first resolution conditioned on features of latent values at a second resolution. The modulation layer may, for example, be a Feature-wise Linear Modulation (FILM) layer, e.g., as described in Perez et al., arXiv: 1709.07871.

In some implementations, the width and/or depth of the synthesis and/or decoder neural networks may be adjusted as part of the optimization, e.g., to achieve an improved rate-distortion trade-off (optimization of the objective function).

In some implementations, the highest resolution latent grid may have the same resolution as the input data grid, whilst in other implementations, the highest resolution latent grid may have a resolution that is less than the resolution of the input data grid.

In some implementations, output values of the decoder neural network may be exponentiated to determine the one or more probability distribution parameters. A pre-determined shift value may be added to the output values prior to exponentiation. Optimizing the objective function may comprise determining a transformation to apply to the output values prior to exponentiation, e.g., determining a shift value to add to the output values prior to exponentiation.

In some implementations, the synthesis neural network and/or the decoder neural network may comprise activation functions that have a higher computational complexity than Rectified Linear Units (ReLUs), e.g., Gaussian error Linear Units (GeLUs), which have been found to achieve higher performance than ReLUs. As the synthesis and decoder neural networks are typically relatively small in size, the use of more computationally expensive activation functions does not typically cause the decoding performance to decrease significantly.

In some implementations, the reconstruction loss term may be determined by: for each of the latent grids, generating from the latent values of the latent grid, upsampled latent data (2) comprising respective upsampled latent values for the input data grid points; and using the synthesis neural network to determine, from the upsampled latent data for each of the latent grids, respective reconstructed data values (x) for the input data grid points. That is, the latent values of each of the grids having a resolution that is less than the resolution of the input data grid may be (deterministically) upsampled or interpolated to the resolution of the input data grid. Where a latent grid has the same resolution as the input data grid, the "upsampled" latent data values may be the (unmodified) latent data values. The upsampling may be bilinear or bicubic, for example.

In some examples, the input data values may be captured using one or more sensors in a real-world environment. For example, audio data may be captured using one or more audio sensors or microphones, while image data or video data may be captured using one or more image sensors or cameras (including depth-measuring cameras, such as LIDAR cameras). Input data values of an image or video may comprise monochrome or color pixels of the image or video. The image may be a 2D or 3D image. As defined herein an "image" includes a point cloud e.g. from a LIDAR system, and a "pixel" includes a point of the point cloud. Similarly references to a moving image or video include a time sequence of point clouds. Objects in the image or video may comprise objects, e.g. physical objects, represented by the image or video.

In some examples, each of the input data grid points may correspond to a respective time interval or frequency component of an audio waveform and the input data values correspond to amplitude values of the audio waveform for the respective time interval or frequency components of the audio waveform. Thus the input data may comprise audio data representing values of an audio waveform, e.g., instantaneous amplitude data or time-frequency domain data. The audio data may comprise recorded speech data, for example.

In some examples, each of the input data grid points may correspond to a respective pixel location in one or more images (or part(s) of one or more images). The input data values may correspond to a channel (e.g., one of one or more channels) of the image. In other words, the input data grid and the latent grids may be two dimensional (2D) grids. The channels may, for example, comprise one or more of: intensity, color, transparency and depth channels. The latent values for each of the latent grids may capture structure in the image at different spatial frequencies, for example.

In some examples, each of the input data grid points may correspond to a respective frame in a sequence of image frames of a video and a respective pixel location in the respective image frame. The input data values may correspond to a channel (e.g., one of one or more channels) of the image frame. In other words, the input data grid and the latent grids may be three dimensional (3D) grids having a time dimension and two spatial dimensions. The channels may, for example, comprise one or more of: intensity, color (e.g. RGB or HSV), transparency and depth channels.

The method may further comprise dividing the video into a plurality of video patches, each video patch corresponding to a proper subset of the pixels of each image frame and/or a proper subset of the image frames of the video; and for each of the video patches performing steps (a) to (c) to encode the input data values of the video patch. The use of patches may facilitate the use of hardware accelerators, whereby different patches are encoded in parallel.

In general, the data grids can have any number of dimensions appropriate to the input data values, such as one-dimensional data grids (e.g., in the case of audio data or other temporal sensor data, or data that varies along a single spatial coordinate, and so on), two-dimensional data grids (e.g., for image data), three-dimensional data grids (e.g., for video data), or data grids having more than three dimensions (e.g., for input data comprising temporally varying 3D spatial data).

The causal subset of (or "context" for) the latent values for each of the latent grid points may comprise selected latent values of another latent grid corresponding to an image frame of the video that precedes the image frame corresponding to the latent grid point in the sequence of image frames. That is, the causal subset may be a 3D causal "neighbourhood" that extends over spatial and time dimensions. The selected latent values may be selected using a mask that is learnt during the optimizing of the objective function. For example, a location of the mask (e.g., a rectangular mask) within the image frame may be learnt during the optimizing of the objective function. The spatial size of the causal subset may be increased (decreased) to capture relatively faster (slower) motion in the video. Learning of a mask (e.g., a location and/or size of a mask) for selecting the latent values for the causal subset may also be used for images analogously.

In some implementations, the optimizing may be performed for input data corresponding to a plurality of training examples to generate a corresponding synthesis neural network, decoder neural network and set of latent values for each of the one or more training examples, wherein at least some of the parameters of the synthesis neural networks and/or the decoder neural networks are shared between the training examples. The input data of the plurality of training examples may, for example, correspond to different respective images or videos, or to parts (patches) of one image or video.

In some implementations, the method can further comprising providing (e.g., to a client device) the encoded latent values in a bitstream.

In some implementations, the method may further comprise: quantizing and encoding the parameters of the synthesis neural network and the decoder neural network; and providing the encoded latent values and the respective encoded parameters of the synthesis neural network and the decoder neural network in a bitstream. The bitstream may be stored at the one or more data processing apparatus (which may be a server or cloud computer, for example). The bitstream may be transmitted to another one or more data processing apparatus in one or more locations (e.g., a mobile device or a personal computing device of a user) for storage and/or decoding.

In implementations, decoding the bitstream (e.g., at the other one or more data processing apparatus) may comprise: decoding portions of the bitstream to recover the parameters of the synthesis neural network and the parameters of the decoder neural network; decoding a further portion of the bitstream to recover the latent values, and obtaining respective reconstructed data values for each of the input data grid points. Decoding a further portion of the bitstream to recover the latent values may comprise: for each of the latent grid points of each of the latent grids: determining a causal subset of (or "context" for) the latent values comprising latent values corresponding to latent grid points that precede the latent grid point in the latent grid; using the decoder neural network to determine, from the latent values in the causal subset, one or more probability distribution parameters defining a conditional probability distribution for a latent value at the latent grid point; and obtaining a latent value for the latent grid point by sampling a latent value from the conditional probability distribution; obtaining respective reconstructed data values for each of the input data grid points, may comprise: for each of the latent grids, generating from the latent values of the latent grid, upsampled latent data comprising respective upsampled latent values for the input data grid points; and using the synthesis neural network to determine, from the upsampled latent data for each of the latent grids, respective reconstructed data values for the input data grid points. In some implementations, wavefront decoding (rather than e.g., an autoregressive approach) may be used to improve decoding runtime, see for example, Clare et al. "Wavefront parallel processing for HEVC encoding and decoding", Joint collaborative team on video coding (JCT-VC), document JCTVC-E196, Geneva.

In a further aspect, there is provided a method of encoding an image (or part/patch of an image) performed by one or more data processing apparatus, the image comprising image data values corresponding to respective pixels of the image (and, optionally, to a channel of the image), the method comprising: (a) optimizing an objective function by jointly optimizing parameters of a synthesis neural network, parameters of a decoder neural network, and a set of latent values, the latent values corresponding to respective latent grid points of each of a plurality of latent grids having different respective spatial resolutions, wherein the optimizing comprises, for each of a plurality of optimization iterations, determining gradients of the objective function using the latent values and using the gradients to update one or more of: the parameters of the synthesis neural network, the parameters of the decoder neural network, and the latent values; (b) quantizing the optimized latent values; and (c) encoding the quantized latent values using a probability distribution for the latent values, the probability distribution being defined by the decoder neural network, wherein the objective function comprises a reconstruction loss term comparing the image data values with corresponding reconstructed data values determined from the set of latent values using the synthesis neural network and a compressibility term dependent on a probability of the set of latent values determined from the probability distribution defined by the decoder neural network. The method may additionally comprise one or more of the features described above for the first aspect. For example, the optimizing may further comprise updating the latent values by applying a soft-rounding function to each of the latent values, the soft-rounding function being a smooth approximation to a hard-rounding function.

In a further aspect, there is provided, a method of encoding a video (or part/patch of a video) comprising a sequence of image frames, the method being performed by one or more data processing apparatus, the video comprising video data values corresponding to respective pixels in a respective image frame in the sequence (and optionally, to a channel of the image frame), the method comprising: (a) optimizing an objective function by jointly optimizing parameters of a synthesis neural network, parameters of a decoder neural network, and a set of latent values, the latent values corresponding to respective latent grid points of each of a plurality of latent grids having different respective resolutions, wherein the optimizing comprises, for each of a plurality of optimization iterations, determining gradients of the objective function using the latent values and using the gradients to update one or more of: the parameters of the synthesis neural network, the parameters of the decoder neural network, and the latent values; (b) quantizing the optimized latent values; and (c) encoding the quantized latent values using a probability distribution for the latent values, the probability distribution being defined by the decoder neural network, wherein the objective function comprises a reconstruction loss term comparing the video data values with corresponding reconstructed data values determined from the set of latent values using the synthesis neural network and a compressibility term dependent on a probability of the set of latent values determined from the probability distribution defined by the decoder neural network. The method may additionally comprise one or more of the features described above for the first aspect. For example, optimizing may further comprise updating the latent values by applying a soft-rounding function to each of the latent values, the soft-rounding function being a smooth approximation to a hard-rounding function.

According to a yet further aspect, there is provided a method of decoding input data encoded as latent values using the method of any of the above described aspects (e.g. the first aspect). The method of decoding comprises: obtaining the parameters of the synthesis neural network and the decoder neural network, and using the synthesis neural network and the decoder neural network to decode (e.g., some or all) of the encoded latent values. For example, the method can comprise decoding only a part (e.g., a patch) of an image encoded as the set of latent values, e.g., using only a subset of the set of latent values. As another example, the method can comprise decoding only the set of latent values corresponding to a subset of the plurality of latent grids, e.g., to obtain decoded data at a resolution below the resolution that can be obtained if latent values corresponding to each of the plurality of latent grids is used (e.g., a resolution that is lower than the resolution of the original input data).

In some implementations, using the synthesis neural network and the decoder neural network to decode the encoded latent values, comprises, for each of the latent grid points of each of the latent grids: determining a causal subset of the latent values comprising latent values corresponding to latent grid points that precede the latent grid point in the latent grid; using the decoder neural network to determine, from the latent values in the causal subset, one or more probability distribution parameters defining a conditional probability distribution for a latent value at the latent grid point; and obtaining a latent value for the latent grid point by sampling a latent value from the conditional probability distribution; and obtaining respective reconstructed data values for each of the input data grid points, comprising: for each of the latent grids, generating from the latent values of the latent grid, upsampled latent data comprising respective upsampled latent values for the input data grid points; and using the synthesis neural network to determine, from the upsampled latent data for each of the latent grids, respective reconstructed data values for the input data grid points.

According to a further aspect there is provided a system comprising: one or more computers; and one or more storage devices communicatively coupled to the one or more computers, wherein the one or more storage devices store instructions that, when executed by the one or more computers, cause the one or more computers to perform operations of the method of the above-described first aspect or other aspects.

According to a still further aspect there is provided one or more non-transitory computer storage media storing instructions that when executed by one or more computers cause the one or more computers to perform operations of the method of the above-described first aspect or other aspects.

According to a further aspect there is provided one or more non-transitory computer storage media storing encoded data comprising latent values obtained by the method of the above-described first aspect or other aspects.

Hardware or apparatus for encoding and/or decoding data may be adapted to perform the methods described herein. For example, the hardware or apparatus can include special purpose logic circuitry, e.g., an FPGA (field programmable gate array) or an ASIC (application-specific integrated circuit). The special purpose logic circuitry may be configured to encode the input data in parallel, at least to some extent, e.g., by performing operations on the latent values of the different latent grids in parallel, where applicable. The special purpose logic circuitry may also be specifically adapted for particular image and/video sizes (e.g. width and height dimensions) to enable highly efficient processing of such image and/or videos. For example, the memory of the hardware or apparatus, may be configured to ensure that the input data and/or the latent data can be stored and accessed efficiently. For example, the sizes of the latent grids and/or a number of discrete values used in quantizing the latent values may be selected to correspond to the available memory of the hardware or apparatus (or a virtual machine operating on the hardware or apparatus).

Particular embodiments of the subject matter described in this specification can be implemented so as to realize one or more of the following advantages.

Generally, the subject matter relates to encoding input data for the purpose of reducing the amount of data that needs to be stored or transmitted, whilst permitting accurate reconstruction of the input data. In particular, the methods described herein may achieve high compression performance with low decoding complexity.

Input data may be encoded (compressed) to achieve strong rate-distortion (RD) performance, whilst having a decoding complexity that is greatly reduced compared to other neural compression methods that have a similar rate-distortion performance. For example, image or video data encoded using the methods described herein may be decoded using fewer multiply-accumulate operations per pixel (MACs/pixel) than other neural compression methods. For example, in some cases, neural codecs that achieve similar rate-distortion performance as the presently disclosed methods may require more than an order of magnitude more MACs. The present methods may therefore be particularly suited to cases where the decoding of the encoded data is carried out by hardware constrained devices, such as mobile devices.

As the parameters of the synthesis and decoder neural networks and the latent values are optimized for the (particular) input data values, high performance of the synthesis and decoder neural networks for other sets of input data values does not need to be achieved, i.e., the synthesis and decoder neural networks are not required to generalize to other input data. That is, the synthesis and decoder neural networks may be overfit to the input data values, e.g., to a single image or video (or patch of a video). The number of parameters of the synthesis and decoder neural networks may therefore be relatively low compared to other neural compression techniques, such as those based on autoencoders. Accordingly, the networks may have a lower computational complexity than other neural compression techniques.

The methods disclosed herein may also be used to encode video data effectively.

The methods disclosed herein may also require significantly fewer iterations to achieve good encoding (e.g. rate distortion) performance. Thus, encoding time may achieve similar encoding performance as other neural compression methods with significantly lower amounts of computation (e.g., FLOPs) and/or less processor time.

In some implementations, the objective function can be optimized by optimizing the set of latent values, whilst values of the parameters of one or both of the synthesis neural network and the decoder neural network remain unchanged (i.e., the parameters are "frozen"). In this way, the parameters of the one or both of the synthesis neural network and the decoder neural network can be used for decoding sets of latent values that encode different respective input data. Thus, the encoded data need not comprise the parameters of the one or both of the synthesis neural network and the decoder neural network, which can e.g., reduce the amount of data that needs to be transferred between an encoder computer device (such as a server) and a decoder computer device (such as a client device). As one example, the parameters of the synthesis neural network and/or the decoder neural network can be pre-installed on a client device (such as a mobile device), e.g., as part of the operating system or a program library of the client device. As another example, the method can comprise, at a client device storing the parameters of the synthesis neural network and/or the decoder neural network, receiving a plurality of sets of latent values encoding different input data, and using the parameters of the synthesis neural network and/or the decoder neural network to decode each set of latent values. As the same parameters of the synthesis neural network and/or the decoder neural network can be used for multiple sets of latent values, fewer computational resources (e.g., bandwidth) may be needed to transmit and/or store the multiple sets of encoded data. In some implementations, only a subset of the parameters of one or both of the synthesis neural network and the decoder neural network may be frozen, thereby reducing the number of trainable (optimizable) parameters associated with a given an set of latent values.

BRIEF DESCRIPTION OF THE DRAWINGS

Like reference numbers and designations in the various drawings indicate like elements.

DETAILED DESCRIPTION

Figure 1:
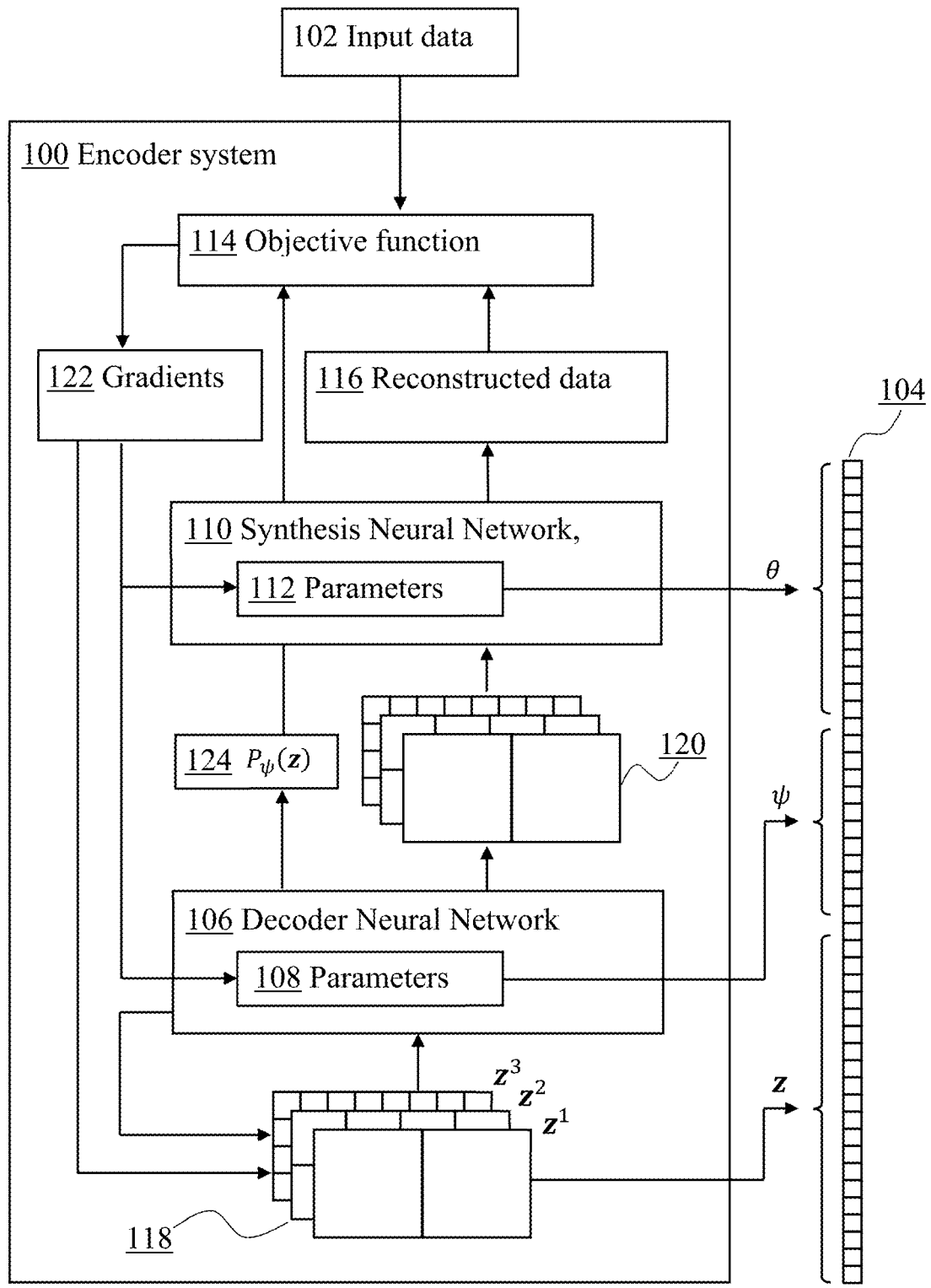
FIG. 1 is a block diagram of an example encoder system for encoding input data.

FIG. 1 shows an exemplary encoder system 100 for encoding input data 102 to generate corresponding encoded data 104. The encoder system 100 is an example of a system implemented as computer programs on one or more computers in one or more locations in which the systems, components, and techniques described below are implemented.

The input data 102 comprises a plurality input data values corresponding to respective input data grid points of an input data grid. For example, the input data 102 may correspond to an image or video, or to part (e.g., a patch) of one image or video. Alternatively or additionally, the input data 102 can comprise audio data.

The encoder system 100 comprises a decoder neural network ($g_\psi$) 106 (e.g., an entropy model) that comprises a plurality of decoder neural network parameters ($\psi$) 108, a synthesis neural network ($f_\theta$) 110 that comprises a plurality of synthesis neural network parameters ($\theta$) 112, and an objective function $\mathcal{L}_{\theta,\psi}(z)$ 114 that comprises a reconstruction loss term comparing the input data values 102 with corresponding reconstructed data values 116 generated by the encoder system 100, i.e., data values 116 that can be obtained from the encoded data 104 and that reproduce or resemble the input data 102. The objective function can additionally include a compressibility term dependent on a probability $P_\psi(z)$ 124 of the set of latent values determined from the probability distribution defined by the decoder neural network 106. Examples of the probability distribution defined by the decoder neural network 106 are discussed below in connection with FIG. 3.

The encoder system 100 is configured to generate a set of latent values 118 that correspond to respective latent grid points of each of a plurality of latent grids having different respective resolutions. The plurality of latent grids can comprise any number of latent grids greater than one, e.g., 2, 3, 4, 5, 10, and so on. In some implementations, the latent grids can be arranged as a hierarchy to efficiently capture structure at different spatial and/or temporal frequencies. For example, when the input data 102 comprises an image, the latent grids can be of shape (h, w), $$\left(\frac{h}{2}, \frac{w}{2}\right), \ldots, \left(\frac{h}{2^{N-1}}, \frac{w}{2^{N-1}}\right),$$

where h and w are the height and width of the image, respectively, and N is the number of latent grids.

The encoder system 100 is configured to encode the input data 102 by adjusting the decoder neural network parameters 108, the synthesis neural network parameters 112 and the set of latent values 118 to optimize the objective function 114. The optimization is performed over a plurality of optimization iterations.

In some implementations, the decoder neural network 106 is configured to receive a network input comprising the set of latent values 118 and to generate, in accordance with the decoder neural network parameters 108, a network output comprising a decoded set of latent values 120 that correspond to the respective latent grid points of each of the plurality of different resolution latent grids. For example, the decoder neural network 106 can encode the latent values using a probability distribution for the latent values, the probability distribution being defined by the decoder neural network 112 (e.g., entropy model). Further details of the decoder neural network 106 are described below with reference to FIG. 3.

The synthesis neural network 110 is configured to process the decoded set of latent values 120 generated by the decoder neural network 106 to generate the reconstructed data 116. Further details of the synthesis neural network 110 are described below with reference to FIG. 4.

The encoder system 100 is configured to optimize the objective function 114 by jointly optimizing, over the plurality of optimization iterations, the decoder neural network parameters 108, the synthesis neural network parameters 112 and the set of latent values 118. For example, the encoder system can be configured to, at each optimization iteration, (i) determine, e.g., by backpropagation, gradients $\Delta_{\theta,\psi,z}\mathcal{L}_{\theta,\psi}(z)$ 122 of the objective function with respect to the decoder neural network parameters 108, the synthesis neural network parameters 112, and the set of latent values 118; and (ii) use the gradients 122 to adjust the decoder neural network parameters 108, the synthesis neural network parameters 112, and the set of latent values 118 to optimize the objective function 114. In some implementations, the encoder system 100 can perform the optimization using gradient descent e.g., using a stochastic gradient descent, RMSprop, or Adam optimizer, or another known or learned optimizer. As one example, a cosine decay schedule for the learning rate can be used.

The objective function 114 comprises a reconstruction loss term comparing the input data values 102 with corresponding reconstructed data values 116 determined from the set of latent values using the synthesis neural network, and a compressibility term dependent on a probability of the set of latent values 118 determined from a probability distribution defined by the decoder neural network 106.

As one example, the objective function can comprise:

$$\mathcal{L}_{\theta,\psi}(z) = \|x - f_\theta(Up(z))\|_2^2 - \lambda \Sigma_n \log_2 P_\psi(z^n),$$

where θ denotes the synthesis neural network parameters 112, ψ denotes the decoder neural network parameters 108, z denotes the latent values 118 (collectively), x denotes the input data 102 (e.g., an image), $f_\theta$ denotes the synthesis neural network 110, which in this example applies an upsampling function Up(•) to the latent values, $\|\ldots\|_2^2$ is a squared $l_2$-norm, λ denotes a scaling factor ("rate distortion weight"), $P_\psi(z^n)$ is the probability of the set of latent values determined from the probability distribution defined by the decoder neural network, and $z^n$ denotes the latent values corresponding to latent grid points of the n-th latent grid in the plurality of latent grids.

The objective function 114 can be configured to allow a trade-off between better reconstruction of the input data 102 by the encoder system 100 and more compressible latent values 118. For example, by increasing the weighting (1) of the compressibility term in the objective function 114 relative to the reconstruction loss, the size of the encoded data 104 can be reduced, whilst decreasing the weighting can improve rate-distortion performance.

The encoder system 100 is configured to, during the optimization, update the latent values 118 by applying a soft-rounding function to each of the latent values. The soft-rounding function is a smooth approximation to a hard-rounding function. In general, a rounding function acts on an input value to generate an output value that is a lower precision approximation of the input value. In the case of a hard-rounding function, such as round(z), ceil(z) or floor(z), the mapping between the input value and the output value can be discontinuous.

In some implementations, the soft-rounding function can be parameterized by a temperature parameter T that controls the smoothness of the function, such that as T tends towards zero, the soft-rounding function can tend towards the hard-rounding function. As T tends towards infinity, the soft-rounding function can tend towards the identity function. The temperature parameter can be adjusted ("annealed") over the course of the optimization. For example, the temperature parameter can be decreased during the optimization such that the soft-rounding function becomes increasingly like a hard-rounding function. Higher values of the temperature parameter can lead to lower variance for the gradients 122 (which can improve the optimization process), whilst lower values of the temperature parameter can result in a better approximation of the hard-rounding function.

As one example, for a hard-rounding function denoted as $\lfloor y \rfloor$, the soft-rounding function can take the form:

$$s_T(y) = \lfloor y \rfloor + \frac{1}{2} \frac{\tanh(r/T)}{\tanh(2/T)} + \frac{1}{2}, \text{ where } r = y - \lfloor y \rfloor - \frac{1}{2}.$$

The encoder system 100 can be configured to update each of the latent values by sampling a respective noise value from a noise distribution and adding the noise value to the latent value. The soft-rounding function can be applied to each of the latent values before and/or after adding the respective noise value.

Different noise distributions can be used for the optimization. As one example, the noise distribution can be a Kumaraswamy distribution, which has compact support on [0, 1] and can allow for more efficient sampling as the cumulative distribution function can be determined analytically. Shape parameters of the noise distribution (e.g., Kumaraswamy distribution) can be adjusted during the optimization. For example, the shape parameters can be varied (e.g., interpolated) between a peaked (lower noise) distribution and a more uniform distribution during the optimization.

The encoder system 100 is further configured to quantize the optimized latent values 118, e.g., using a hard-rounding function, and to encode the quantized latent values 118 using using a probability distribution for the latent values. For example, the encoder system 100 can be configured to further optimize the decoder neural network parameters 108 (and optionally, the synthesis neural network parameters 112) whilst the quantized latent values remain fixed. The optimized decoder neural network parameters 108 allow the decoder (e.g., entropy model) neural network 106 to generate the set of a decoded set of latent values 120 from the set of quantized latent values 118 by sampling from a probability distribution. Thus, the set of quantized latent values 118 obtained during the optimization process are encoded using the probability distribution defined the decoder neural network 106.

The encoded data 104 can comprise the decoder neural network parameters 108, the synthesis neural network parameters 112 and the set of quantized latent values 118. That is, the optimized decoder neural network parameters 108, the optimized synthesis neural network parameters 112 and the optimized set of quantized latent values 118 collectively encode the input data 102. As one example, the encoded data 104 can be provided in the form of a bitstream. In some implementations, the encoder system 100 can be configured to transmit the encoded data 104 to one or more other computers (e.g., client devices) for decoding.

Figure 2:
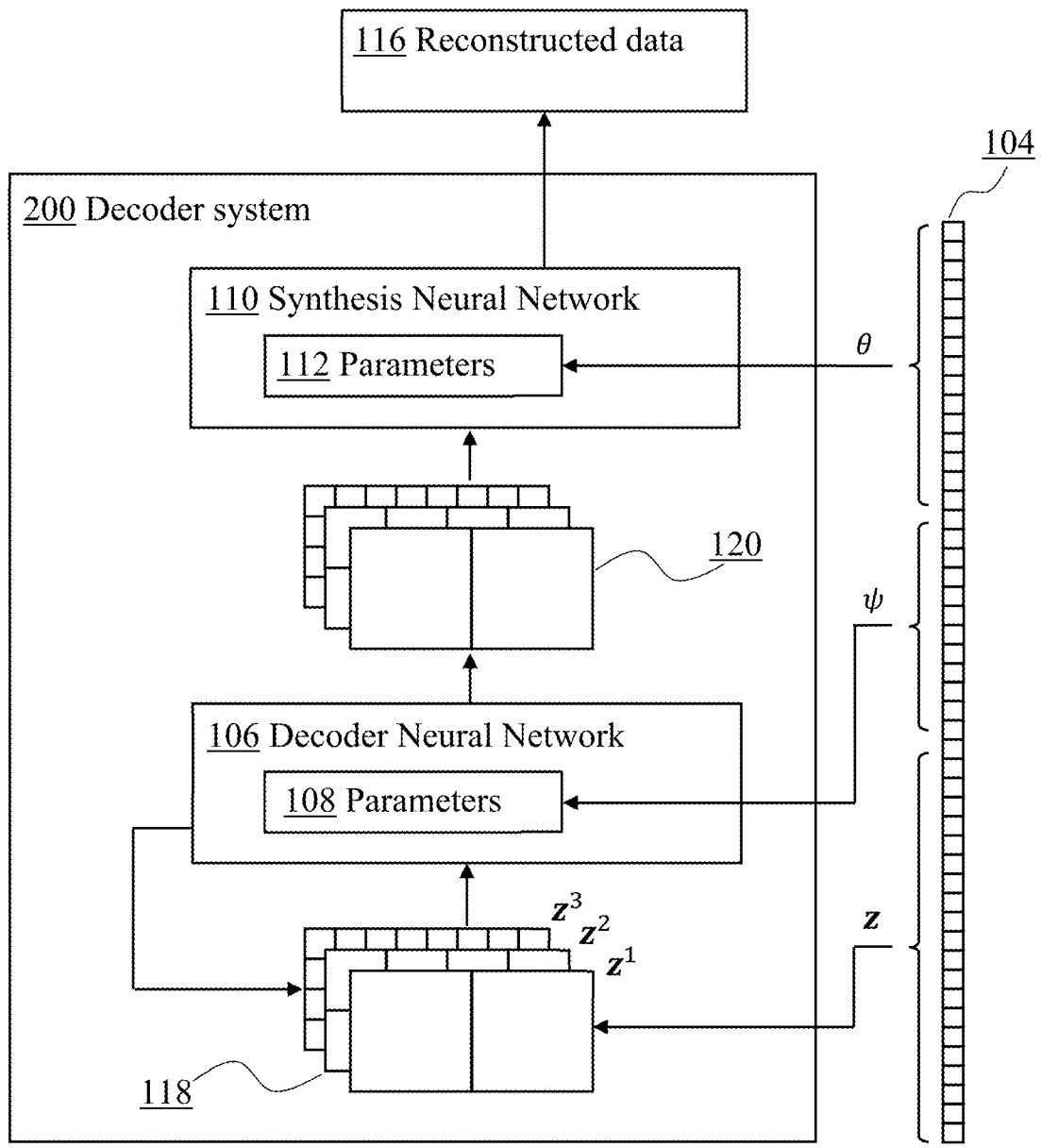
FIG. 2 a block diagram of an example decoder system for decoding encoded data.

FIG. 2 shows a decoder system 200 for decoding the encoded data 104. The decoder system 200 is an example of a system implemented as computer programs on one or more computers in one or more locations in which the systems, components, and techniques described below are implemented.

The decoder system 200 comprises the synthesis neural network 110 and the decoder neural network 106 of the encoder system 100. In some implementations the decoder system is a subsystem of the encoder system 100, i.e., an encoder system 100 can be configured to both generate encoded data 104 from received input data 102 and generate reconstructed data 120 corresponding to the input data 102 from received encoded data 104. As one example, the decoder system 200 can be implemented on a client device (e.g., a mobile device) configured to receive the encoded data 104 from a server comprising the encoder system 100.

The decoder system 200 is configured to: (i) extract the decoder neural network parameters 108 and the synthesis neural network parameters 112 from the encoded data 104; and (ii) configure the decoder neural network parameters 108 and the synthesis neural network parameters 112 using the extracted decoder neural network parameters 108 and the extracted synthesis neural network parameters 112, respectively.

The decoder system 200 is further configured to extract the set of (encoded) quantized latent values 118 from the encoded data 104 and to process the set of quantized latent values 118 to generate the reconstructed data 116, e.g., using a forward pass through the decoder system 200, which can comprise the decoder neural network 106 performing a plurality of autoregressive steps to generated a decoded set of latent values 120. The processing performed by the decoder system 200 can correspond to the processing performed by the encoder system 100 to generate the reconstructed data 116 during the optimization procedure (i.e., the processing other than determining values of the objective function 114 and gradients 112, and adjusting the synthesis and decoder neural network parameters 108, 112 and the set of latent values 118).

The processing performed by the decoder system 200 is now described in more detail in connection with FIGS. 3 and 4.

Figure 3:
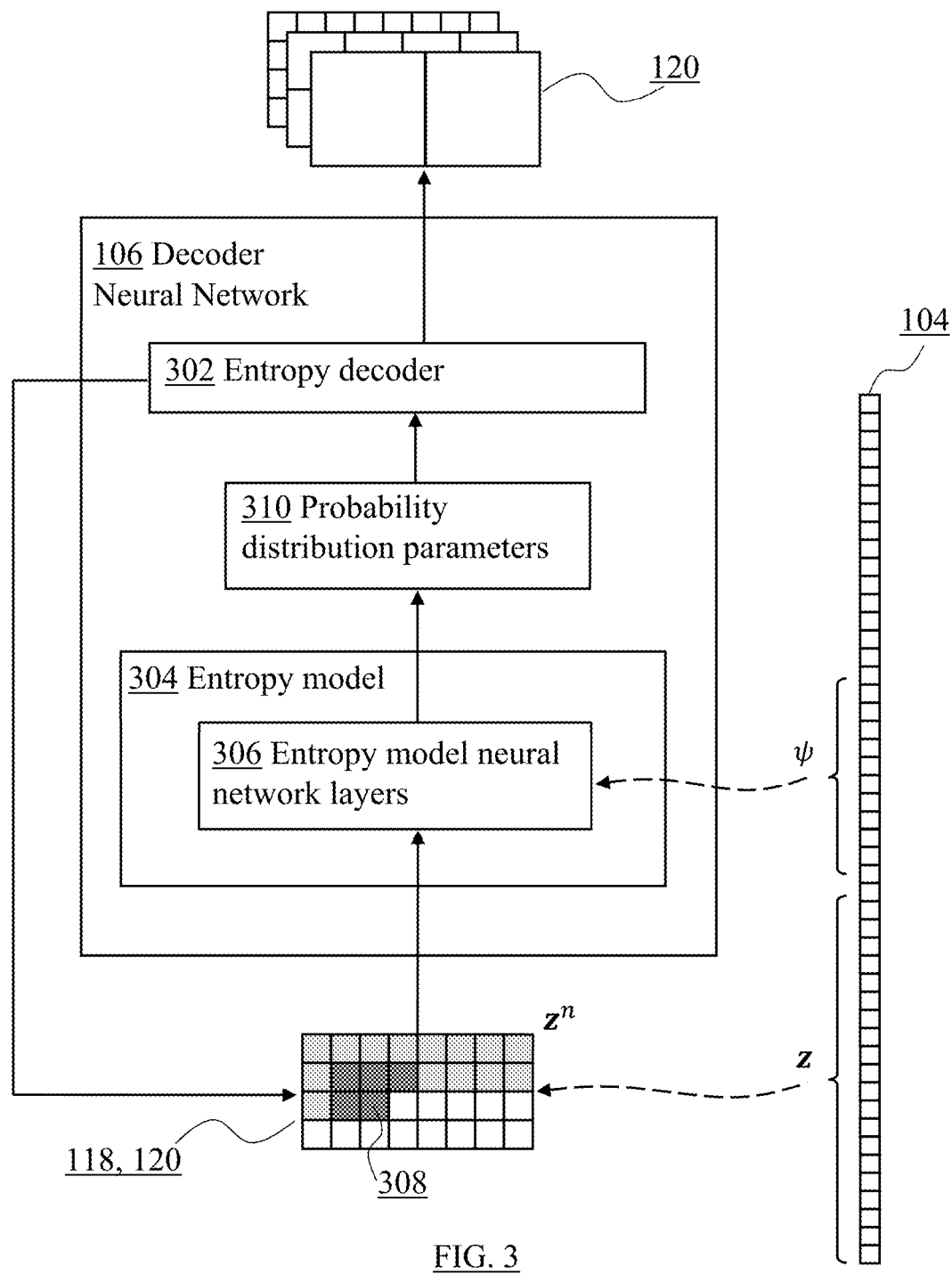
FIG. 3 is a block diagram of the decoder neural network of FIGS. 1 and 2.

FIG. 3 shows a decoder neural network 106 comprising an entropy decoder 302 and an entropy model 304. In this example, the entropy model 304 is a neural network comprising a plurality of entropy model neural network layers 306 that are configured using (i.e., initialized with) the decoder neural network parameters 108 extracted from the encoded data 104. The decoder neural network is configured to process the set of quantized latent values 118 to obtain the set of decoded latent values 120. As an example, the entropy model neural network layers 306 can comprise a plurality of convolutional neural network layers, such as multiple (e.g., three) 1×1 convolutional neural network layers. However, any appropriate neural network layers can be used, e.g., self-attention neural network layers, or fully-connected neural network layers and so on.

The latent values 118 for each latent grid of the plurality of latent grids can be processed independently using the decoder neural network 106. That is, the same decoder neural network parameters 108 can be used when processing the latent values 118 for each of the latent grids. Alternatively, different the decoder neural network parameters 108 can comprise different subsets of parameters that can be used by the decoder neural network 106 for different latent grids.

To obtain the decoded latent values 120 for each latent grid, the quantized latent values 118 of each latent grid may be processed autoregressively by the decoder neural network 106, e.g., in a raster scan order.

The entropy model 304 is configured to receive, for each latent grid point of a latent grid, an entropy model input comprising a subset (or "context") 308 of the set of latent values 118 for the latent grid and to generate, in accordance with the decoder neural network parameters 108, an entropy model output defining one or more probability distribution parameters 310 corresponding to the decoded latent value 118 for the latent grid point.

As one example, the subset 308 can be a causal subset of the latent values 118 that comprise latent values 118, 120 corresponding to latent grid points that precede the latent grid point in the latent grid. In some implementations, the subset 308 of the set of latent values for the latent grid can be obtained by applying a causal mask to the set of latent values for the latent grid. For example, the causal mask can select latent values 118, 120 corresponding to latent grid points that are proximate the latent grid point for which the decoded latent value 120 is being calculated. In the case of the input data comprising video data, the causal mask can select latent grid points that are both spatially and temporally proximate the latent grid point, e.g., latent grid points of one or more frames of the video data that precede the frame of the video data associated with the latent grid point for which the decoded latent value 120 is being calculated.

In some implementations, the subset 308 can comprise latent values 120 of one or more others of the latent grids in addition to the latent values 120 of the latent grid being processed. For example, the subset 308 can comprise latent values of one or more latent values of latent grids that have a lower resolution than the latent grid being processed. Alternatively, or additionally, the entropy model 304 can be configured to use different respective subsets of parameters of the decoder neural network parameters 108 depending on which of the latent grids is being processed, e.g., the entropy model can be adapted for different resolutions of latent grid.

The one or more probability distribution parameters 310 can comprise one or more location and/or scale parameters for a probability distribution over potential values for the corresponding decoded latent value 120, such as a measure of central tendency (e.g., a mean) and/or a variance.

The entropy decoder 302 is configured to receive an entropy decoder input comprising the one or more probability distribution parameters 310 to generate an entropy decoder output comprising the decoded latent value 120 for the grid point of the latent grid. The decoded latent value 120 can be obtained by sampling from the probability distribution for the decoded latent value 310 defined by the probability distribution parameters 310. In some implementations, the probability distribution is an integrated Laplace distribution and the one or more probability distribution parameters 310 can comprise location and/or scale parameters for the integrated Laplace distribution.

In some examples, the probability distribution is a product of conditional probability distributions for each latent value, each conditional probability distribution being conditioned on latent values for latent grid points in the latent grid that precede the latent grid point of the latent value (and, optionally, on latent values in other latent grids of different (e.g., lower) spatial resolution than the latent grid of the latent value). For example, the probability distribution can be expressed as:

$$P_\psi(z^n) = \Pi_{i,j} P(z^n; \mu_{i,j}^n, \sigma_{i,j}^n).$$

where $\mu_{i,j}^n$ and $\sigma_{i,j}^n$ are respective location and scale parameters for grid point i, j of the for the n-th latent grid. The location and scale parameters are determined from:

$$\mu_{i,j}^n, \sigma_{i,j}^n = g_\psi(\text{context}(z^n, (i,j))),$$

where context(•) corresponds to the subset 308 of the latent values for the grid point. In some implementations, individual grids of the latent values can be modelled independently with the same network, $g_\psi$, $P_\psi(z^n)$.

Figure 4:
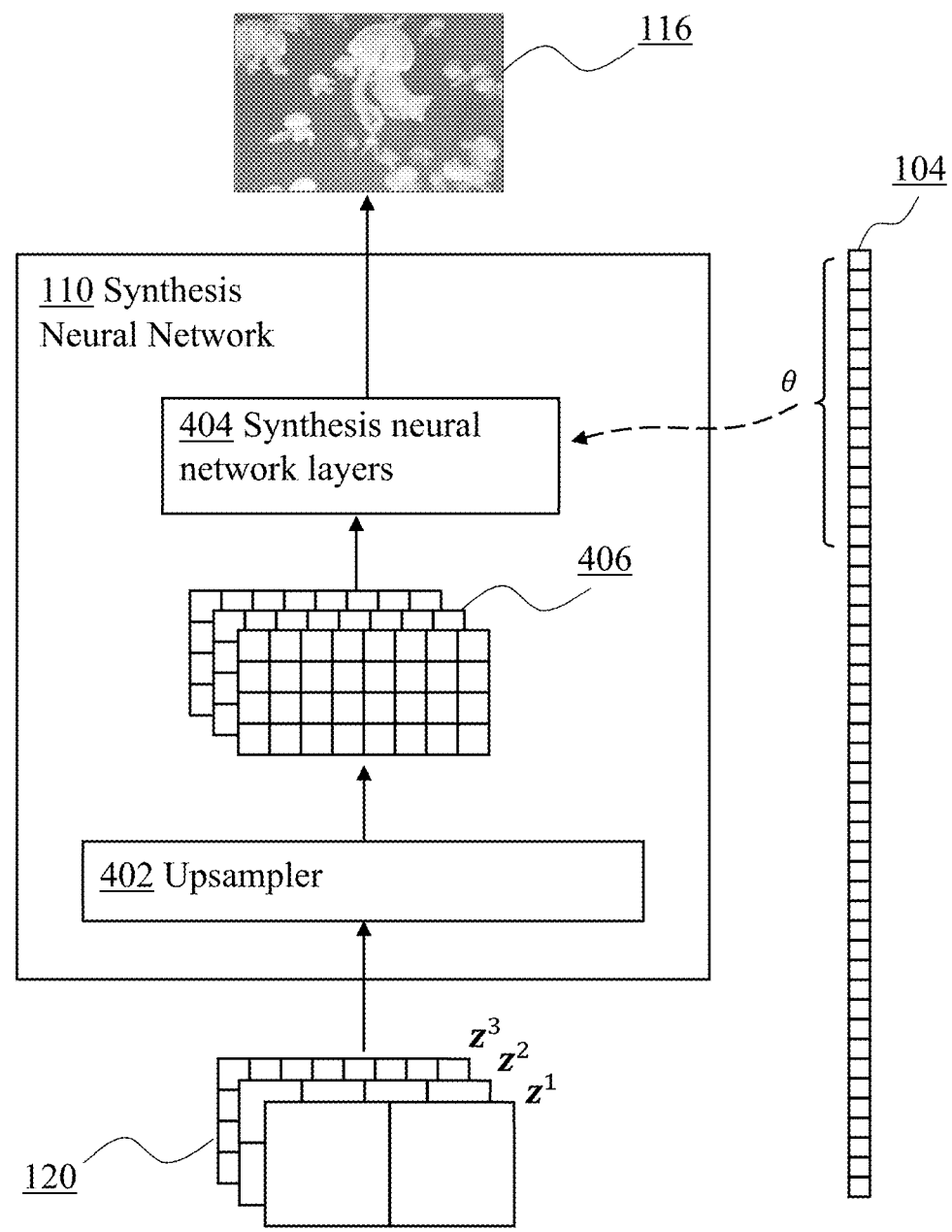
FIG. 4 is a block diagram of the synthesis neural network of FIGS. 1 and 2.

FIG. 4 shows a synthesis neural network 110 comprising an upsampler 402 (e.g., an upsampler neural network) and a plurality of synthesis neural network layers 404. The synthesis neural network 110 is configured to extract the synthesis neural network parameters 112 from the encoded data 104 and to configure the synthesis neural network layers 406 using the extracted synthesis neural network parameters 112. In some implementations, the synthesis neural network parameters 112 also comprise parameters for the upsampler 402, which have been determined during the optimization process, e.g., jointly with the parameters for the synthesis neural network layers 404, in which cases, the synthesis neural network 110 also configures the upsampler 402 using the extracted synthesis neural network parameters 112. An example upsampler is described in section II of Leguay et al. arXiv: 2307.1276v1.

The upsampler 402 is configured to receive an upsampler input comprising the decoded latent values 120 and to generate (e.g., in accordance with synthesis neural network parameters 112, e.g., extracted from the encoded data 104) a corresponding upsampler output comprising, for each latent grid, decoded latent values 406 that each correspond to a respective latent grid point of a latent grid having the same resolution as the input data 102. For example, where the input data 102 comprises an image, the upsampler 402 is configured to upsample the decoded latent values 120 for each of the different resolution latent grids to the same resolution as the image. As one example, the upsampler 402 can perform the upsampling by bilinear or bicubic interpolation.

The synthesis neural network layers 404 are configured to process the upsampled latent values 406 to generate, in accordance with the synthesis neural network parameters 112 extracted from the encoded data 104, the reconstructed data 116, e.g., an image having the same resolution as an image that was encoded using the encoder system 100. For example, the synthesis neural network layers 404 can be configured to process a concatenated tensor of the upsampled latent values 406 to predict pixel values of the image. As an example, the entropy model neural network layers 306 can comprise a plurality of convolutional neural network layers, e.g., a combination of 1×1 and 3×3 convolutional neural network layers. However, any appropriate configuration of neural network layers can be used, e.g., self-attention neural network layers, or fully connected neural network layers and so on.

Figure 5:
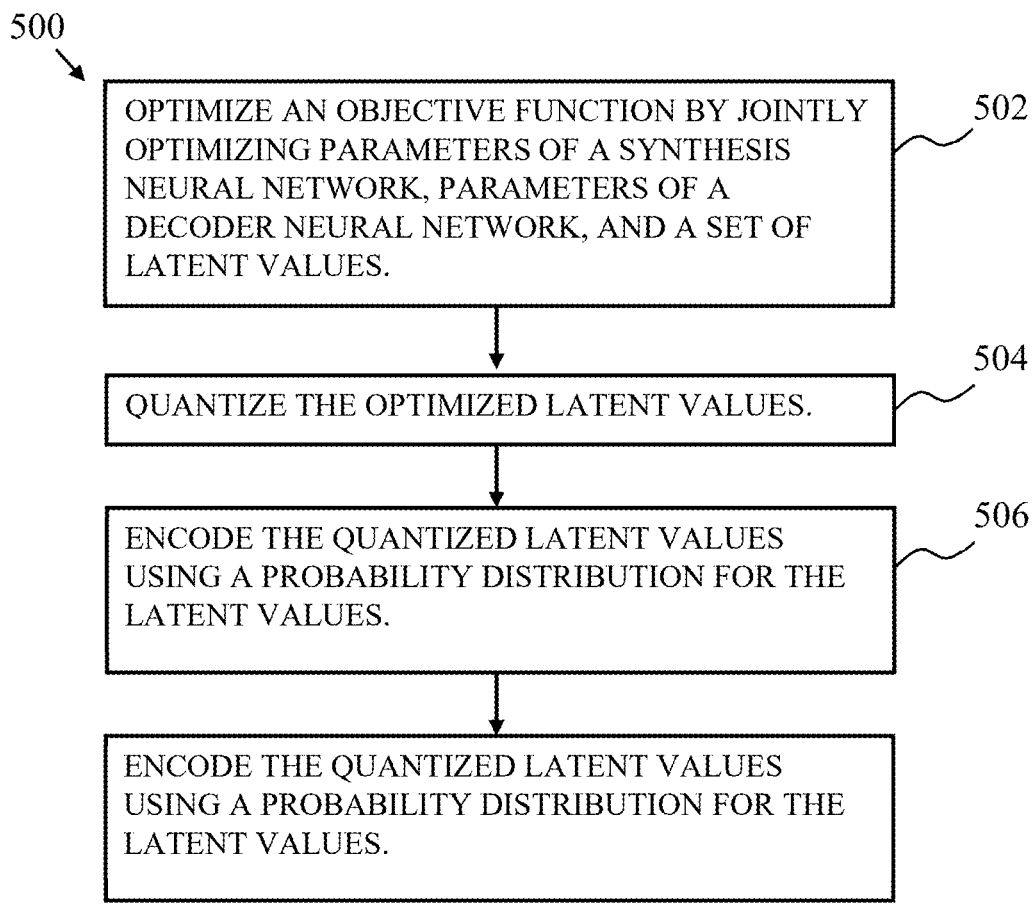
FIG. 5 is a flow diagram of an example process for encoding input data.

FIG. 5 shows a flow diagram of an example process 500 for encoding input data. For convenience, the process 500 will be described as being performed by a system of one or more computers located in one or more locations. For example, an encoder system, e.g., the encoder system 100 of FIG. 1, appropriately programmed in accordance with this specification, can perform the process 500.

The system receives input data comprising input data values corresponding to respective input data grid points of an input data grid.

The process 500 comprises optimizing (step 502) an objective function by jointly optimizing parameters of a synthesis neural network, parameters of a decoder neural network, and a set of latent values. As described above, the latent values correspond to respective latent grid points of each of a plurality of latent grids having different respective resolutions. The optimizing comprises, for each of a plurality of optimization iterations, determining gradients of the objective function using the latent values and using the gradients to update one or more of: the parameters of the synthesis neural network, the parameters of the decoder neural network, and the latent values.

The process further comprises quantizing (step 504) the optimized latent values and encoding the quantized latent values using a probability distribution for the latent values. The objective function comprises a reconstruction loss term comparing the input data values with corresponding reconstructed data values determined from the set of latent values using the synthesis neural network, and a compressibility term dependent on a probability of the set of latent values determined from the probability distribution defined by the decoder neural network.

Figure 6:
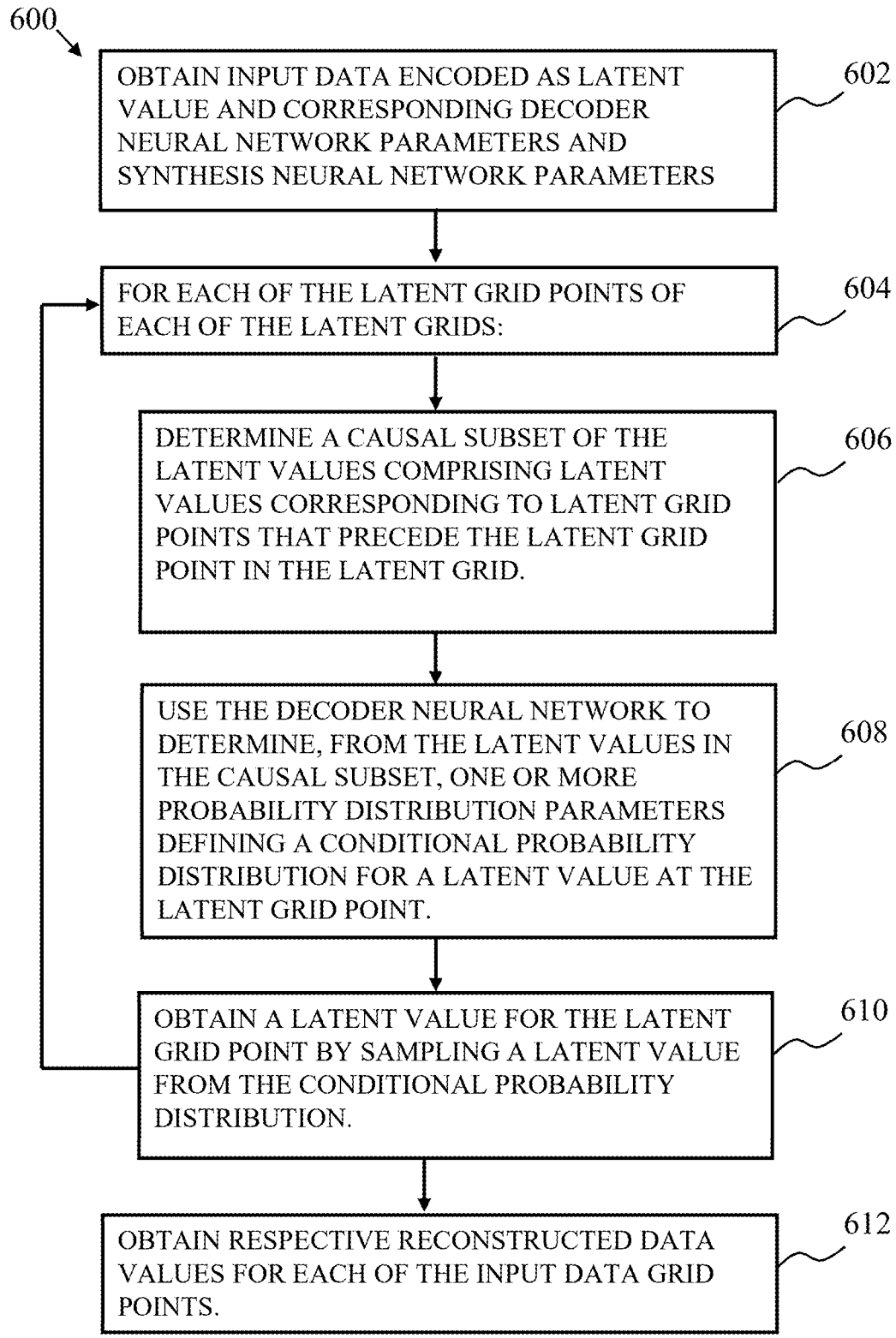
FIG. 6 is a flow diagram of an example process for decoding encoded data.

FIG. 6 shows a flow diagram of an example process 600 for decoding encoded data (such as encoded data 102 as described above in connection with FIG. 1). For convenience, the process 600 will be described as being performed by a system of one or more computers located in one or more locations. For example, an encoder system, e.g., the encoder system 100 or the decoder system 200 of FIG. 2, appropriately programmed in accordance with this specification, can perform the process 600.

The process 600 comprises obtaining (step 602) input data encoded as latent values and corresponding parameters of the synthesis neural network and the decoder neural network. The process 600 further comprises, for each of the latent grid points of each of the latent grids (step 604):
  Step 606: Determining a causal subset of the latent values comprising latent values corresponding to latent grid points that precede the latent grid point in the latent grid.
  Step 608: Using the decoder neural network to determine, from the latent values in the causal subset, one or more probability distribution parameters defining a conditional probability distribution for a latent value at the latent grid point; and
  Step 610: Obtaining a latent value for the latent grid point by sampling a latent value from the conditional probability distribution.

The process 600 further comprises obtaining (step 612) respective reconstructed data values for each of the input data grid points. For example, the system can, for each of the latent grids, generate from the latent values of the latent grid, upsampled latent data comprising respective upsampled latent values for the input data grid points; and use the synthesis neural network to determine, from the upsampled latent data for each of the latent grids, respective reconstructed data values for the input data grid points.

Figure 7:
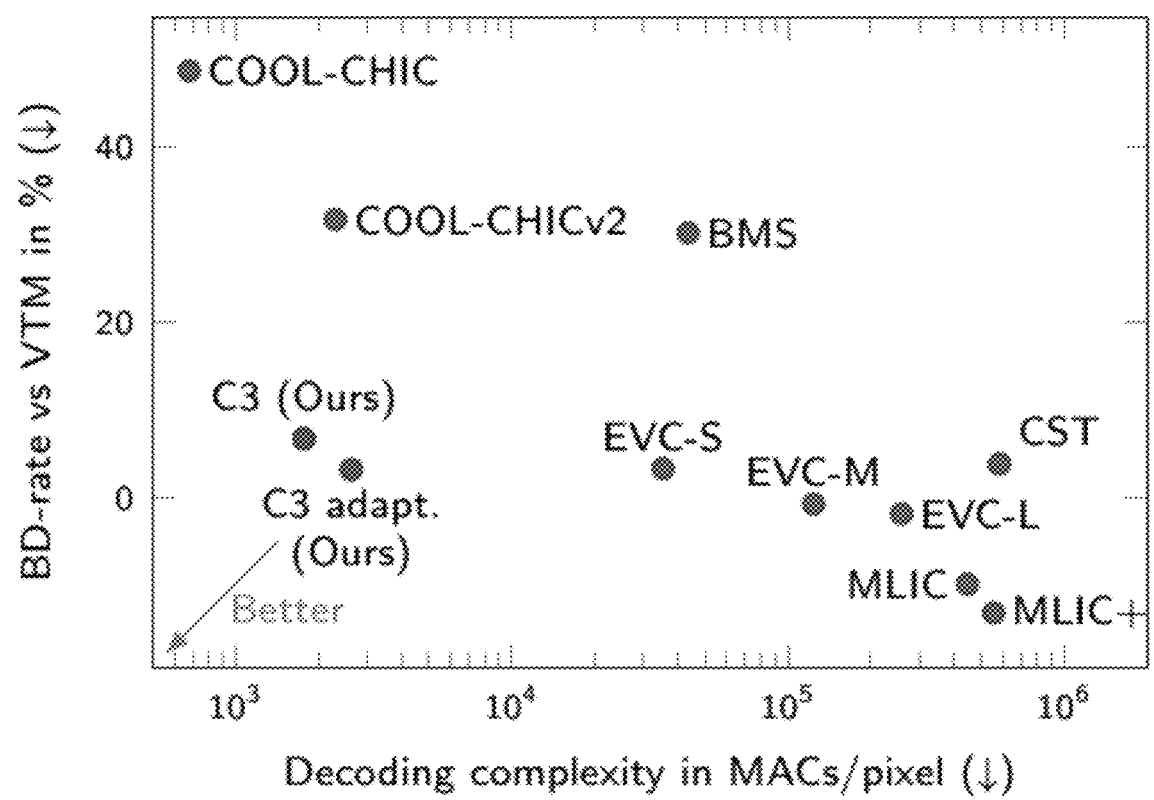
FIG. 7 is a graph comparing rate-distortion performance and decoding complexity for the techniques described in this specification compared to other encoding techniques.

FIG. 7 shows rate-distortion performance (BD-rate) vs. decoding complexity on the Kodak image benchmark. The encoding methods described in this specification (labelled as C3 and C3 adapt. in FIG. 6) achieve a better trade-off than existing neural codecs. For example, the encoding methods substantially improve rate-distortion performance with respect to the COOL-CHIC codec while maintaining a low decoding complexity.

Figure 8:
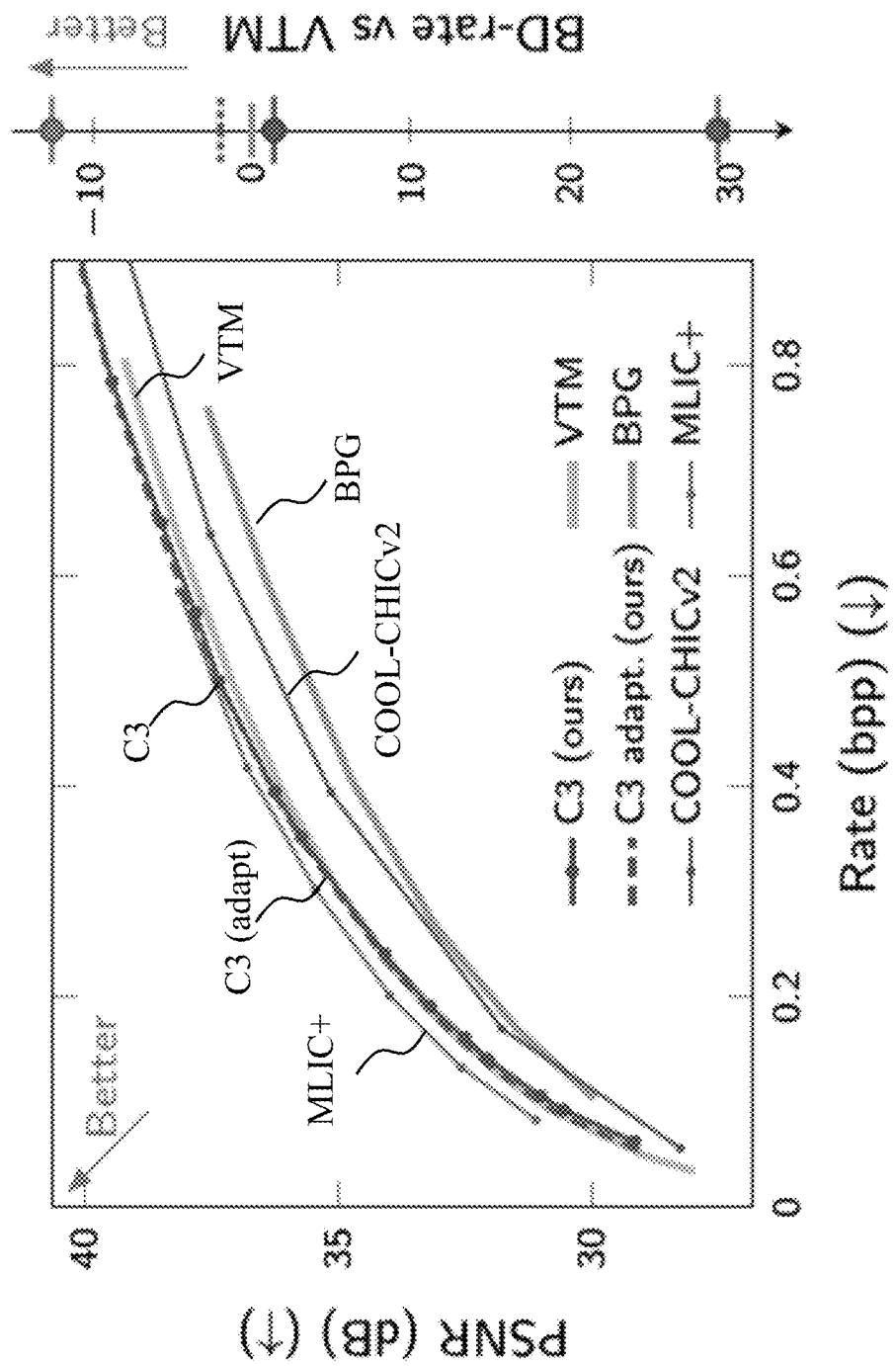
FIG. 8 is a graph comparing rate-distortion curves and Bjontegaard Delta-Rate (BD-rate) for the techniques described in this specification compared to other encoding techniques.

FIG. 8 shows rate-distortion curves and BD-rate on the CLIC2020 benchmark. When the model is adapted to each image (i.e. the optimization is performed for each image), the present techniques ("C3 adapt.") can be seen to outperform VTM (−1.9% BD-rate), which is believed to be the first time that a neural codec has been able to match VTM while having very low decoding complexity (below 3k MACs/pixel, where a MAC is a multiply-accumulate operation).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In addition to the embodiments described above, the following embodiments are also innovative:

Embodiment 1 is a method of encoding input data performed by one or more data processing apparatus, the input data comprising input data values corresponding to respective input data grid points of an input data grid, the method comprising: (a) optimizing an objective function by jointly optimizing parameters of a synthesis neural network, parameters of a decoder neural network, and a set of latent values, the latent values corresponding to respective latent grid points of each of a plurality of latent grids having different respective resolutions, wherein the optimizing comprises, for each of a plurality of optimization iterations, determining gradients of the objective function using the latent values and using the gradients to update one or more of: the parameters of the synthesis neural network, the parameters of the decoder neural network, and the latent values; (b) quantizing the optimized latent values; and (c) encoding the quantized latent values using a probability distribution for the latent values, the probability distribution being defined by the decoder neural network, wherein the objective function comprises a reconstruction loss term comparing the input data values with corresponding reconstructed data values determined from the set of latent values using the synthesis neural network, and a compressibility term dependent on a probability of the set of latent values determined from the probability distribution defined by the decoder neural network, and wherein the optimizing further comprises updating the latent values by applying a soft-rounding function to each of the latent values.

Embodiment 2 is the method of embodiment 1, wherein updating the latent values comprises: updating each of the latent values by sampling a respective noise value from a noise distribution and adding the noise value to the latent value, wherein the soft-rounding function is applied to each of the latent values before and/or after adding the respective noise value.

Embodiment 3 is the method according to any of embodiments 1-2, wherein the noise distribution is non-uniform.

Embodiment 4 is the method of embodiment 3, wherein the noise distribution has a shape parameter that controls a shape of the noise distribution and shape parameter is adjusted between the optimization iterations to make the noise distribution become more uniform.

Embodiment 5 is the method of any of embodiments 1-4, wherein the soft-rounding function depends on a temperature parameter that controls a smoothness of the soft-rounding function, the temperature parameter being adjusted between the optimization iterations.

Embodiment 6 is the method of embodiment 5, wherein the temperature parameter is adjusted between the optimization iterations such that the soft-rounding function increasingly resembles the hard-rounding function.

Embodiment 7 is the method of any of embodiments 1-6, wherein: using the gradients comprises multiplying the gradients by a learning rate before updating the one or more of: the parameters of the synthesis neural network, the parameters of the decoder neural network, and the latent values; and the learning rate varies between the optimization iterations according to a cosine schedule.

Embodiment 8 is the method of any of embodiments 1-7, wherein the optimizing further comprises, for each of a plurality of further optimization iterations: quantizing the latent values using a further hard-rounding function; using a soft-rounding estimator to determine further gradients of the objective function using the quantized latent values, wherein the soft-rounding estimator provides a smooth approximation to the gradient of the further hard-rounding function; and using the further gradients determined using the soft-rounding estimator to update one or more of: the parameters of the synthesis neural network, the parameters of the decoder neural network, and the latent values.

Embodiment 9 is the method of embodiment 8, wherein the soft-rounding estimator depends on a temperature parameter that controls the smoothness of the gradient of the soft-rounding function, the temperature parameter being adjusted between the further optimization iterations such that the gradient of the soft-rounding function increasingly resembles the gradient of the further hard-rounding function.

Embodiment 10 is the method of any of embodiments 8-9, wherein: using the further gradients comprises multiplying the further gradients by a further learning rate before updating the one or more of: the parameters of the synthesis neural network, the parameters of the decoder neural network, and the latent values; and the further learning rate is decreased between the further optimization iterations.

Embodiment 11 is the method of any one of embodiments 8-10, wherein the further hard-rounding function quantizes the latent values in steps smaller than the steps used by a hard-rounding function for quantizing the latent values after the optimizing.

Embodiment 12 is the method of any of embodiments 10 or 11, wherein the further hard-rounding function quantizes the latent values in steps smaller than one.

Embodiment 13 is the method of any of embodiments 1-12, wherein the probability of the set of latent values is determined by, for each of the latent grid points of each of the latent grids: determining a causal subset of the latent values comprising latent values corresponding to latent grid points that precede the latent grid point in the latent grid; and using the decoder neural network to determine, from the latent values in the causal subset, one or more probability distribution parameters defining a conditional probability distribution for a latent value at the latent grid point; and using the conditional probability distribution defined by the one or more probability distribution parameters to determine the probability of the latent value conditioned on the latent values in the causal subset.

Embodiment 14 is the method of embodiment 13, wherein for one or more of the latent grids, the causal subsets of the latent values for each of the latent grid points of the latent grid comprise latent values of another of the latent grids that has a resolution that is less than a resolution of the latent grid.

Embodiment 15 is the method of embodiment 14, wherein the other latent grid immediately precedes the latent grid when the latent grids are arranged in ascending order of resolution.

Embodiment 16 is the method of any of embodiments 13-15, wherein the decoder neural network comprises a plurality of encoder subnetworks, each encoder subnetwork being configured to process the latent values of a respective one of the latent grids.

Embodiment 17 is the method of embodiment 16, wherein each encoder subnetwork processes the latent values of the respective one of the latent grids independently of the latent values of the other latent grids.

Embodiment 18 is the method of any of embodiments 13-17, wherein the decoder neural network comprises an input layer, an output layer, and intermediate layers between the input and output layers, the intermediate layers comprising activation functions for determining features of the latent values at different resolutions, wherein one or more of the intermediate layers comprises a modulation layer configured to apply a transformation to features of latent values at a first resolution conditioned on features of latent values at a second resolution.

Embodiment 19 is the method of any of embodiments 13-18, wherein output values of the decoder neural network are exponentiated to determine the one or more probability distribution parameters and wherein a pre-determined shift value is added to the output values prior to exponentiation.

Embodiment 20 is the method of any of embodiments 1-19, wherein the synthesis neural network and/or the decoder neural network comprises activation functions that have a higher computational complexity than Rectified Linear Units.

Embodiment 21 is the method of any of embodiments 1-20, wherein the reconstruction loss term is determined by: for each of the latent grids, generating from the latent values of the latent grid, upsampled latent data comprising respective upsampled latent values for the input data grid points; and using the synthesis neural network to determine, from the upsampled latent data for each of the latent grids, respective reconstructed data values for the input data grid points.

Embodiment 22 is the method of any of embodiments 1-21, wherein each of the input data grid points corresponds to a respective time interval or frequency component of an audio waveform and the input data values correspond to amplitudes of the audio waveform.

Embodiment 23 is the method of any of embodiments 1-21, wherein each of the input data grid points corresponds to a respective pixel location in one or more images or part of one or more images.

Embodiment 24 is the method of any of embodiments 1-21, wherein each of the input data grid points corresponds to a respective frame in a sequence of image frames of a video and a respective pixel location in the respective image frame.

Embodiment 25 is the method of embodiment 24, further comprising: dividing the video into a plurality of video patches, each video patch corresponding to a proper subset of the pixels of each image frame and/or a proper subset of the image frames of the video; and for each of the video patches performing steps (a) to (c) to encode the input data values of the video patch.

Embodiment 26 is the method of any of embodiments 24 or 25, when dependent on claim 13, wherein the causal subset of the latent values for each of the latent grid points comprises selected latent values of another latent grid corresponding to an image frame of the video that precedes the image frame corresponding to the latent grid point in the sequence of image frames.

Embodiment 27 is the method of embodiment 26, wherein the selected latent values are selected using a mask that is learnt during the optimizing of the objective function.

Embodiment 28 is the method of embodiment 27, wherein a location of the mask within the image frame is learnt during the optimizing of the objective function.

Embodiment 29 is the method of any of embodiments 1-28, wherein the optimizing is performed for input data corresponding to a plurality of training examples to generate a corresponding synthesis neural network, decoder neural network and set of latent values for each of the one or more training examples, wherein at least some of the parameters of the synthesis neural networks and/or the decoder neural networks are shared between the training examples.

Embodiment 30 is the method of embodiment 29, wherein the input data of the plurality of training examples correspond to different respective images or videos, or to parts of one image or video.

Embodiment 31 is the method of any of embodiments 1-30, further comprising providing the encoded latent values in a bitstream.

Embodiment 32 is the method of any of embodiments 1-30, further comprising: quantizing and encoding the parameters of the synthesis neural network and the decoder neural network; and providing the encoded latent values and the encoded parameters of the synthesis neural network and the decoder neural network in a bitstream.

Embodiment 33 is the method of embodiment 32, further comprising transmitting the bitstream to another one or more data processing apparatus.

Embodiment 34 is the method of any of embodiments 32 or 33, further comprising decoding the bitstream, the decoding comprising: decoding portions of the bitstream to recover the parameters of the synthesis neural network and the parameters of the decoder neural network; decoding a further portion of the bitstream to recover the latent values, comprising: for each of the latent grid points of each of the latent grids: determining a causal subset of the latent values comprising latent values corresponding to latent grid points that precede the latent grid point in the latent grid; using the decoder neural network to determine, from the latent values in the causal subset, one or more probability distribution parameters defining a conditional probability distribution for a latent value at the latent grid point; and obtaining a latent value for the latent grid point by sampling a latent value from the conditional probability distribution; and obtaining respective reconstructed data values for each of the input data grid points, comprising: for each of the latent grids, generating from the latent values of the latent grid, upsampled latent data comprising respective upsampled latent values for the input data grid points; and using the synthesis neural network to determine, from the upsampled latent data for each of the latent grids, respective reconstructed data values for the input data grid points.

Embodiment 34 is a method of encoding an image performed by one or more data processing apparatus, the image comprising image data values corresponding to respective pixels of the image, the method comprising: (a) optimizing an objective function by jointly optimizing parameters of a synthesis neural network, parameters of an decoder neural network, and a set of latent values, the latent values corresponding to respective latent grid points of each of a plurality of latent grids having different respective spatial resolutions, wherein the optimizing comprises, for each of a plurality of optimization iterations, determining gradients of the objective function using the latent values and using the gradients to update one or more of: the parameters of the synthesis neural network, the parameters of the decoder neural network, and the latent values; (b) quantizing the optimized latent values; and (c) encoding the quantized latent values using a probability distribution for the latent values, the probability distribution being defined by the decoder neural network, wherein the objective function comprises a reconstruction loss term comparing the image data values with corresponding reconstructed data values determined from the set of latent values using the synthesis neural network, and a compressibility term dependent on a probability of the set of latent values determined from the probability distribution defined by the decoder neural network.

Embodiment 36 is a method of encoding a video comprising a sequence of image frames, the method being performed by one or more data processing apparatus, the video comprising video data values corresponding to respective pixels in a respective image frame in the sequence, the method comprising: (a) optimizing an objective function by jointly optimizing parameters of a synthesis neural network, parameters of an encoder neural network, and a set of latent values, the latent values corresponding to respective latent grid points of each of a plurality of latent grids having different respective resolutions, wherein the optimizing comprises, for each of a plurality of optimization iterations, determining gradients of the objective function using the latent values and using the gradients to update one or more of: the parameters of the synthesis neural network, the parameters of the decoder neural network, and the latent values; (b) quantizing the optimized latent values; and (c) encoding the quantized latent values using a probability distribution for the latent values, the probability distribution being defined by the decoder neural network, wherein the objective function comprises a reconstruction loss term comparing the video data values with corresponding reconstructed data values determined from the set of latent values using the synthesis neural network, and a compressibility term dependent on a probability of the set of latent values determined from the probability distribution defined by the decoder neural network.

Embodiment 37 is the method of any of embodiments 35 or 36, wherein the optimizing further comprises updating the latent values by applying a soft-rounding function to each of the latent values, the soft-rounding function being a smooth approximation to a hard-rounding function.

Embodiment 38 is a method of decoding input data encoded as latent values using the method of any one of embodiments 1-37, the method comprising: obtaining the parameters of the synthesis neural network and the decoder neural network; and using the synthesis neural network and the decoder neural network to decode the encoded latent values.

Embodiment 39 is the method of embodiment 38, wherein using the synthesis neural network and the decoder neural network to decode the encoded latent values comprises: for each of the latent grid points of each of the latent grids: determining a causal subset of the latent values comprising latent values corresponding to latent grid points that precede the latent grid point in the latent grid; using the decoder neural network to determine, from the latent values in the causal subset, one or more probability distribution parameters defining a conditional probability distribution for a latent value at the latent grid point; and obtaining a latent value for the latent grid point by sampling a latent value from the conditional probability distribution; and obtaining respective reconstructed data values for each of the input data grid points, comprising: for each of the latent grids, generating from the latent values of the latent grid, upsampled latent data comprising respective upsampled latent values for the input data grid points; and using the synthesis neural network to determine, from the upsampled latent data for each of the latent grids, respective reconstructed data values for the input data grid points.

Embodiment 40 is a method of decoding input data encoded as latent values, wherein the latent values correspond to respective latent grid points of each of a plurality of latent grids having different respective resolutions, and wherein the latent values have been obtained by an optimization process that comprises updating the latent values by applying a smooth rounding function to the latent values, the method of decoding comprising: obtaining the parameters of a synthesis neural network and a decoder neural network; and decoding the encoded latent values, comprising: for each of the latent grid points of each of the latent grids: determining a causal subset of the latent values comprising latent values corresponding to latent grid points that precede the latent grid point in the latent grid; using the decoder neural network to determine, from the latent values in the causal subset, one or more probability distribution parameters defining a conditional probability distribution for a latent value at the latent grid point; and obtaining a latent value for the latent grid point by sampling a latent value from the conditional probability distribution; and obtaining respective reconstructed data values for each of the input data grid points, comprising: for each of the latent grids, generating from the latent values of the latent grid, upsampled latent data comprising respective upsampled latent values for the input data grid points; and using the synthesis neural network to determine, from the upsampled latent data for each of the latent grids, respective reconstructed data values for the input data grid points.

Embodiment 41 is method of decoding input data encoded as latent values, wherein the latent values correspond to respective latent grid points of each of a plurality of latent grids having different respective resolutions, the method of decoding comprising: obtaining the parameters of a synthesis neural network and a decoder neural network; for each of the latent grid points of each of the latent grids: determining a causal subset of the latent values comprising latent values corresponding to latent grid points that precede the latent grid point in the latent grid; using the decoder neural network to determine, from the latent values in the causal subset, one or more probability distribution parameters defining a conditional probability distribution for a latent value at the latent grid point; and obtaining a latent value for the latent grid point by sampling a latent value from the conditional probability distribution; and obtaining respective reconstructed data values for each of the input data grid points, comprising: for each of the latent grids, generating from the latent values of the latent grid, upsampled latent data comprising respective upsampled latent values for the input data grid points; and using the synthesis neural network to determine, from the upsampled latent data for each of the latent grids, respective reconstructed data values for the input data grid points, wherein: using the decoder neural network to determine the one or more probability distribution parameters comprises applying an activation function that has a higher computational complexity than a Rectified Linear Unit; and/or using the synthesis neural network to determine respective reconstructed data values comprises applying an activation function that has a higher computational complexity than a Rectified Linear Unit.

Embodiment 42 is the method of embodiment 41, wherein the activation function is a Gaussian Error Linear Unit.

Embodiment 43 is a system comprising: one or more computers; and one or more storage devices communicatively coupled to the one or more computers, wherein the one or more storage devices store instructions that, when executed by the one or more computers, cause the one or more computers to perform operations of the respective method of any of embodiments 1-42.

Embodiment 44 is one or more non-transitory computer storage media storing instructions that when executed by one or more computers cause the one or more computers to perform operations of the respective method of any embodiments 1-42.

Embodiment 45 is one or more non-transitory computer storage media storing encoded data comprising latent values encoded using the method of any one of embodiments 1-37.

Embodiment 46 is the one or more non-transitory computer storage media of embodiment 45, wherein the encoded data comprises the encoded parameters of the synthesis neural network and the encoded parameters of the decoder neural network.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of encoding input data performed by one or more data processing apparatus, the input data comprising input data values corresponding to respective input data grid points of an input data grid, the method comprising:
   optimizing an objective function by jointly optimizing parameters of a synthesis neural network, parameters of a decoder neural network, and a set of respective latent values, each respective latent value corresponding to a respective latent grid point of a respective one of a plurality of latent grids having different respective resolutions, and wherein the optimizing comprises, at each of a plurality of optimization iterations:
   generating a respective updated value for each of the respective latent values, comprising:
      generating a respective noise distribution for the optimization iteration, wherein the respective noise distribution for the optimization iteration has a shape that is more uniform than the respective noise distribution for a preceding optimization iteration;
      sampling a respective noise value for each respective latent value from the respective noise distribution for the optimization iteration;
      updating each of the respective latent values by adding the respective noise value for the respective latent value to the respective latent value;
   processing the respective updated values using the synthesis neural network to generate respective reconstructed data values, each corresponding to a respective input data value of the input data values;
   determining a respective probability distribution for each respective updated value using the decoder neural network;
   evaluating the objective function by determining (i) an error between the input data values and the respective reconstructed data values and (ii) a compressibility term based on the respective probability distributions;
   determining gradients of the objective function with respect to the parameters of the synthesis neural network, the parameters of the decoder neural network, and the set of respective latent values; and
   using the gradients to update one or more of: the parameters of the synthesis neural network, the parameters of the decoder neural network, and the respective latent values;
   quantizing the optimized respective latent values; and
   encoding the quantized respective latent values using a probability distribution for the respective latent values, the probability distribution being defined by the decoder neural network.

2. The method according to claim 1, wherein generating a respective updated value for each of the respective latent values comprises:
   prior to updating each of the respective latent values by adding the respective noise value for the respective latent value to the respective latent value, applying a soft-rounding function to each of the respective latent values to update each respective latent value.

3. The method according to claim 1, wherein the respective noise distribution for the optimization iteration is non-uniform.

4. The method according to claim 3, wherein generating the respective noise distribution for the optimization iteration comprises determining the shape of the respective noise distribution based on a shape parameter that controls the shape of the respective noise distribution.

5. The method according to claim 2, wherein the soft-rounding function depends on a temperature parameter that controls a smoothness of the soft-rounding function, the temperature parameter being adjusted between the optimization iterations.

6. The method according to claim 1, wherein:
using the gradients comprises multiplying the gradients by a learning rate before updating the one or more of: the parameters of the synthesis neural network, the parameters of the decoder neural network, and the respective latent values; and
the learning rate varies between the optimization iterations according to a cosine schedule.

7. The method according to claim 1, wherein the optimizing further comprises, at each of a plurality of further optimization iterations:
quantizing the respective latent values using a further hard-rounding function;
using a soft-rounding estimator to determine further gradients of the objective function using the quantized respective latent values, wherein the soft-rounding estimator provides a smooth approximation to the gradient of the further hard-rounding function; and
using the further gradients determined using the soft-rounding estimator to update one or more of: the parameters of the synthesis neural network, the parameters of the decoder neural network, and the respective latent values.

8. The method according to claim 7, wherein the soft-rounding estimator depends on a temperature parameter that controls the smoothness of the gradient of a soft-rounding function corresponding to the soft-rounding estimator, the temperature parameter being adjusted between the further optimization iterations such that the gradient of the soft-rounding function increasingly resembles the gradient of the further hard-rounding function.

9. The method according to claim 7, wherein:
using the further gradients comprises multiplying the further gradients by a further learning rate before updating the one or more of: the parameters of the synthesis neural network, the parameters of the decoder neural network, and the respective latent values; and
the further learning rate is decreased between the further optimization iterations.

10. The method according to claim 7, wherein the further hard-rounding function quantizes the respective latent values in steps smaller than the steps used by a hard-rounding function for quantizing the respective latent values after the optimizing.

11. The method according to claim 9, wherein the further hard-rounding function quantizes the respective latent values in steps smaller than one.

12. The method according to claim 1, wherein the compressibility term is based on a respective probability for each respective latent value, and wherein the respective probabilities are determined by, for each of the respective latent grid points of each of the latent grids:
determining a causal subset of the respective latent values comprising respective latent values corresponding to respective latent grid points that precede the respective latent grid point in the latent grid; and
using the decoder neural network to determine, from the respective latent values in the causal subset, one or more probability distribution parameters defining a conditional probability distribution for a respective latent value at the respective latent grid point; and
using the conditional probability distribution defined by the one or more probability distribution parameters to determine the respective probability of the respective latent value conditioned on the respective latent values in the causal subset.

13. The method according to claim 12, wherein for one or more of the latent grids, the causal subsets of the respective latent values for each of the respective latent grid points of the latent grid comprise respective latent values of another of the latent grids that has a resolution that is less than a resolution of the latent grid.

14. The method according to claim 13, wherein the other latent grid immediately precedes the latent grid when the latent grids are arranged in ascending order of resolution.

15. The method according to claim 12, wherein the decoder neural network comprises a plurality of decoder subnetworks, each decoder subnetwork being configured to process the respective latent values of a respective one of the latent grids.

16. The method according to claim 15, wherein each decoder subnetwork processes the respective latent values of the respective one of the latent grids independently of the respective latent values of the other latent grids.

17. The method according to claim 12, wherein the decoder neural network comprises an input layer, an output layer, and intermediate layers between the input and output layers, the intermediate layers comprising activation functions for determining features of the respective latent values at different resolutions, wherein one or more of the intermediate layers comprises a modulation layer configured to apply a transformation to features of respective latent values at a first resolution conditioned on features of respective latent values at a second resolution.

18. The method according to claim 12, wherein output values of the decoder neural network are exponentiated to determine the one or more probability distribution parameters and wherein a pre-determined shift value is added to the output values prior to exponentiation.

19. The method according to claim 1, wherein one or more of the synthesis neural network or the decoder neural network comprises activation functions that have a higher computational complexity than Rectified Linear Units.

20. The method according to claim 1, wherein determining (i) an error between the input data values and the respective reconstructed data values and (ii) a compressibility term based on the respective probability distributions comprises determining the respective reconstructed data values by:
for each of the latent grids, generating from the respective latent values of the latent grid, upsampled latent data comprising respective upsampled latent values for the input data grid points; and
using the synthesis neural network to determine, from the upsampled latent data for each of the latent grids, the respective reconstructed data values for the input data grid points.

21. The method according to claim 1, wherein each of the input data grid points corresponds to a respective time interval or frequency component of an audio waveform and the input data values correspond to amplitudes of the audio waveform.

22. The method according to claim 1, wherein each of the input data grid points corresponds to a respective pixel location in one or more images or part of one or more images.

23. The method according to claim 1, wherein each of the input data grid points corresponds to a respective frame in a sequence of image frames of a video and a respective pixel location in the respective frame.

24. The method according to claim 23, further comprising:

dividing the video into a plurality of video patches, each video patch corresponding to one or more of: a proper subset of the respective pixel locations of each image frame or a proper subset of the image frames of the video; and wherein the input data comprises one of the plurality of video patches.

25. The method according to claim 23, wherein the compressibility term is based on a respective probability for each respective latent value, and wherein the respective probabilities are determined by, for each of the respective latent grid points of each of the latent grids:
  determining a causal subset of the respective latent values comprising respective latent values corresponding to respective latent grid points that precede the respective latent grid point in the latent grid; and
  using the decoder neural network to determine, from the respective latent values in the causal subset, one or more probability distribution parameters defining a conditional probability distribution for a respective latent value at the respective latent grid point; and
  using the conditional probability distribution defined by the one or more probability distribution parameters to determine the respective probability of the respective latent value conditioned on the respective latent values in the causal subset, and wherein the causal subset of the respective latent values for each of the respective latent grid points comprises selected latent values of another latent grid corresponding to an image frame of the video that precedes the image frame corresponding to the respective latent grid point in the sequence of image frames.

26. The method according to claim 1, wherein the optimizing is performed for input data corresponding to a plurality of training examples to generate a corresponding synthesis neural network, decoder neural network and set of respective latent values for each of the one or more training examples, wherein at least some of the parameters of one or more of the synthesis neural networks or the decoder neural networks are shared between the training examples.

27. The method according to claim 26, wherein the input data of the plurality of training examples correspond to different respective images or videos, or to parts of one image or video.

28. The method according to claim 1, further comprising providing the encoded latent values in a bitstream.

29. A system comprising:
  one or more computers; and
  one or more storage devices communicatively coupled to the one or more computers, wherein the one or more storage devices store instructions that, when executed by the one or more computers, cause the one or more computers to perform a method of encoding input data, the input data comprising input data values corresponding to respective input data grid points of an input data grid, the method comprising:
    optimizing an objective function by jointly optimizing parameters of a synthesis neural network, parameters of a decoder neural network, and a set of respective latent values, each respective latent values corresponding to a respective latent grid point of a respective one of a plurality of latent grids having different respective resolutions, and wherein the optimizing comprises, at each of a plurality of optimization iterations:
      generating a respective updated value for each of the respective latent values, comprising:
        generating a respective noise distribution for the optimization iteration, wherein the respective noise distribution for the optimization iteration has a shape that is more uniform than the respective noise distribution for a preceding optimization iteration;
        sampling a respective noise value for each respective latent value from the respective noise distribution for the optimization iteration;
        updating each of the respective latent values by adding the respective noise value for the respective latent value to the respective latent value;
      processing the respective updated values using the synthesis neural network to generate respective reconstructed data values, each corresponding to a respective input data value of the input data values;
      determining a respective probability distribution for each respective updated value using the decoder neural network;
      evaluating the objective function by determining (i) an error between the input data values and the respective reconstructed data values and (ii) a compressibility term based on the respective probability distributions;
      determining gradients of the objective function with respect to the parameters of the synthesis neural network, the parameters of the decoder neural network, and the set of respective latent values; and
      using the gradients to update one or more of: the parameters of the synthesis neural network, the parameters of the decoder neural network, and the respective latent values;
    quantizing the optimized respective latent values; and
    encoding the quantized respective latent values using a probability distribution for the latent values, the probability distribution being defined by the decoder neural network.

30. One or more non-transitory computer storage media storing instructions that when executed by one or more computers cause the one or more computers to perform operations for encoding input data performed by one or more data processing apparatus, the input data comprising input data values corresponding to respective input data grid points of an input data grid, the operations comprising:
  optimizing an objective function by jointly optimizing parameters of a synthesis neural network, parameters of a decoder neural network, and a set of respective latent values, each respective latent value corresponding to a respective latent grid point of a respective one of a plurality of latent grids having different respective resolutions, and wherein the optimizing comprises, at each of a plurality of optimization iterations:
    generating a respective updated value for each of the respective latent values, comprising:
      generating a respective noise distribution for the optimization iteration, wherein the respective noise distribution for the optimization iteration has a shape that is more uniform than the respective noise distribution for a preceding optimization iteration;
      sampling a respective noise value for each respective latent value from the respective noise distribution for the optimization iteration;

updating each of the respective latent values by adding the respective noise value for the respective latent value to the respective latent value;

processing the respective updated values using the synthesis neural network to generate respective reconstructed data values, each corresponding to a respective input data value of the input data values;

determining a respective probability distribution for each respective updated value using the decoder neural network;

evaluating the objective function by determining (i) an error between the input data values and the respective reconstructed data values and (ii) a compressibility term based on the respective probability distributions;

determining gradients of the objective function with respect to the parameters of the synthesis neural network, the parameters of the decoder neural network, and the set of respective latent values; and using the gradients to update one or more of: the parameters of the synthesis neural network, the parameters of the decoder neural network, and the respective latent values;

quantizing the optimized respective latent values; and encoding the quantized respective latent values using a probability distribution for the respective latent values, the probability distribution being defined by the decoder neural network.

* * * * *